(12) United States Patent
Tomita et al.

(10) Patent No.: US 7,209,259 B2
(45) Date of Patent: Apr. 24, 2007

(54) IMAGE PROCESSING APPARATUS THAT HAS FUNCTION OF EXECUTING REWRITE OF FIRMWARE, IMAGE PROCESSING METHOD, AND PROGRAM

(75) Inventors: Atsushi Tomita, Toyohashi (JP); Hideki Hino, Toyokawa (JP); Hideo Mae, Toyokawa (JP)

(73) Assignee: Minolta Co., Ltd., Osaka-shi, Osaka (JP)

( * ) Notice: Subject to any disclaimer, the term of this patent is extended or adjusted under 35 U.S.C. 154(b) by 850 days.

(21) Appl. No.: 10/216,864

(22) Filed: Aug. 13, 2002

(65) Prior Publication Data

US 2003/0035124 A1    Feb. 20, 2003

(30) Foreign Application Priority Data

Aug. 14, 2001    (JP) .............................. 2001-246242

(51) Int. Cl.
G06K 15/00    (2006.01)
G06F 3/12    (2006.01)
(52) U.S. Cl. .................................... 358/1.18; 358/1.15
(58) Field of Classification Search .............. 358/1.18, 358/1.15, 1.13, 1.16; 709/221
See application file for complete search history.

(56) References Cited

U.S. PATENT DOCUMENTS

2002/0184350 A1 * 12/2002 Chen ........................ 709/221

FOREIGN PATENT DOCUMENTS

| EP | 0996055 | * | 10/1999 |
|---|---|---|---|
| JP | 09-128171 | * | 5/1995 |
| JP | 7-319648 | | 12/1995 |
| JP | 07-319648 | * | 12/1995 |
| JP | 9-128171 | | 5/1997 |
| JP | 10-198540 | * | 7/1997 |
| JP | 10-198540 | | 7/1998 |
| JP | 11-007382 | | 1/1999 |
| JP | 11137950 | * | 5/1999 |
| JP | 2000-151885 | | 5/2000 |
| JP | 2000-162926 | | 6/2000 |
| JP | 2000-311072 | | 11/2000 |
| JP | 2000-322217 | | 11/2000 |
| JP | 2000-326593 | | 11/2000 |

* cited by examiner

*Primary Examiner*—Douglas Q. Tran
(74) *Attorney, Agent, or Firm*—Buchanan Ingersoll & Rooney PC

(57) ABSTRACT

An image processing apparatus connected to a network transfers an unexecuted image processing job to another image processing apparatus connected to the network, during a rewrite time period from when new firmware for a rewrite purpose is obtained to when rewrite to the obtained new firmware is completed, the unexecuted image processing job being at least one of (a) an image processing job that is in a wait state for execution when the new firmware is obtained, and (b) an image processing job that is received during the rewrite time period.

17 Claims, 22 Drawing Sheets

| No. | MODEL | E-MAIL ADDRESS | OTHER INFORMATION... | |
|---|---|---|---|---|
| 1 | model 1 | device1@customer1.com | ... | |
| 2 | model 2 | device2@customer1.com | ... | |
| 3 | model 3 | device3@customer1.com | ... | |
| ⋮ | ⋮ | ⋮ | ⋮ | |

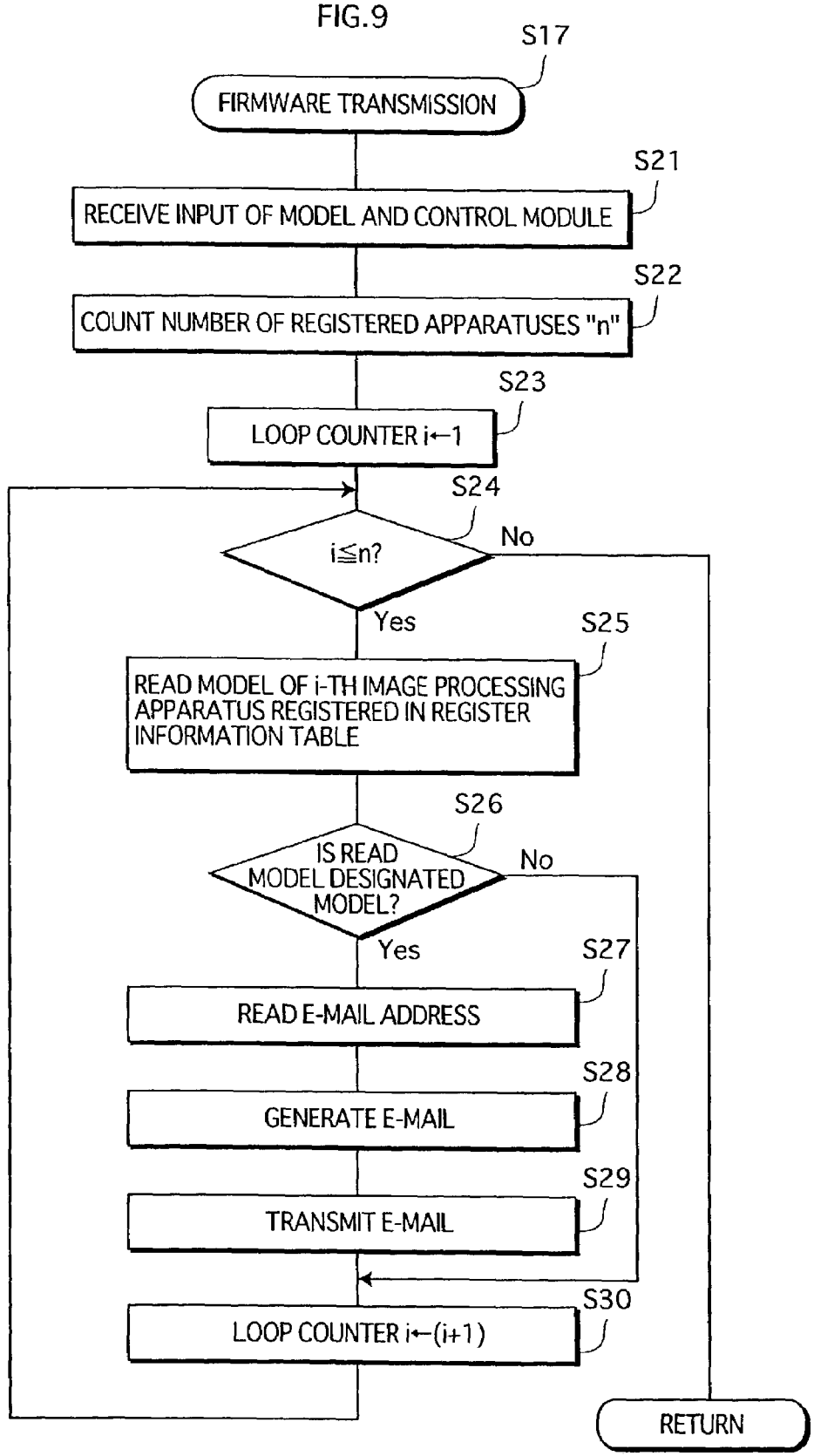

FIG.10

E-MAIL MESSAGE

HEADER:
From: abc@service_center.com
To: device@customer1.com
Date:10 Jan 01 13:18:43 +0900
Subject: model1_1
MIME-Version: 1.0
Content-Type:multipart/mixed:boundary="5kvrZF/hrA"
Content-Description:Firmware

BLANK (NULL LINE)

BODY:
--5kvrZF/hrA
Content-Type:application/octet/stream;name=firmware.dat
Content-Transfer-Encoding:base64

AXAAABQAAAMAAQ9RAQoNEgAAAAAAXAAABQAAAM
AAQ9RAAAAAHgAAAAAHgAVOMDZAdGRLm1pbm9sdGEuY
28uanAKAA
⋮
mBBADEAAWVwbmVOMDZAdGRjLm1pbm9sdGEuY28uanA
KAAAAA=

--5kvrZF/hrA--

| JOB NUMBER | JOB TYPE | ADDITIONAL INFORMATION | MEMORY ADDRESS | CLIENT | DELETION FLAG |
|---|---|---|---|---|---|
| 1 | PRINT JOB | 123(USER ID)..... | 0X1000 | 192.168.0.1 | |
| 2 | PRINT JOB | 125(USER ID)..... | 0X2000 | 192.168.0.2 | |
| 3 | PRINT JOB | 127(USER ID)..... | 0X3000 | 192.168.0.3 | |
| 4 | FIRMWARE REWRITE JOB | model 1-1 | 0X4000 | 111.123.0.1 | |

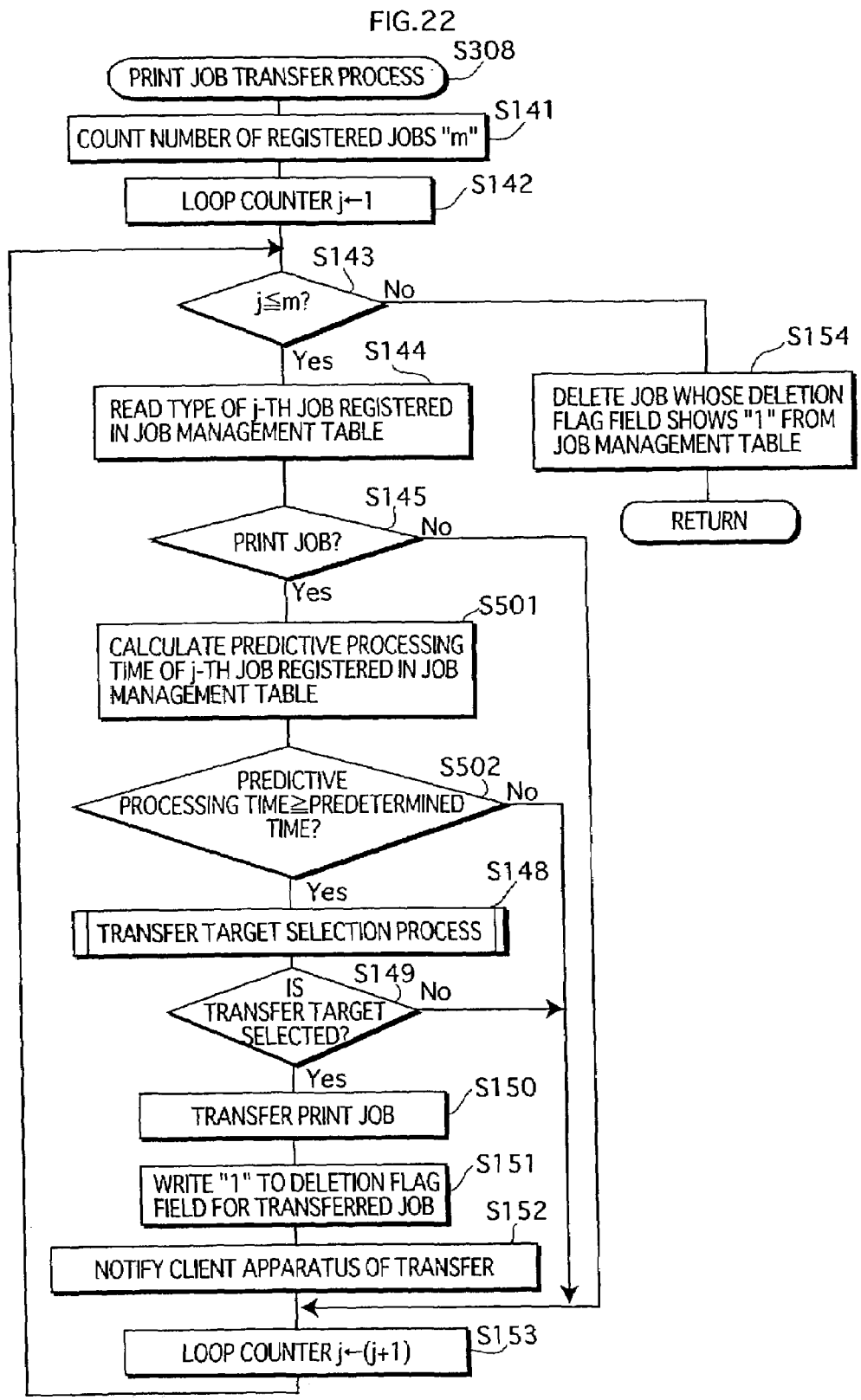

IMAGE PROCESSING APPARATUS THAT HAS FUNCTION OF EXECUTING REWRITE OF FIRMWARE, IMAGE PROCESSING METHOD, AND PROGRAM

This application is based on Patent Application No. 2001-246242 filed in Japan, the contents of which are hereby incorporated by reference.

BACKGROUND OF THE INVENTION

1. Field of the Invention

The present invention relates to an image processing apparatus, an image processing method, and a program, and in particular to an improvement in a control method for making an image processing apparatus execute rewrite of firmware and an image processing job.

2 Related Art

Conventionally, various methods have been proposed for upgrading (rewriting) firmware that controls the operations of a printer. One example of such is a method for connecting a printer to a center apparatus that is located distant from the printer via a network such as the Internet, and transmitting firmware from the center apparatus to the printer, and rewriting contents of a flash ROM that is incorporated in the printer.

In view of the cost, a printer that executes such rewrite of firmware receives firmware conventionally using a serial interface whose transmission speed is low. With the recent trend of an increased capacity of firmware in mega units, rewrite of such firmware with a large capacity may require a processing time of several tens minutes. Also, naturally, a print job cannot be executed while rewrite of firmware is being executed.

Here, rewrite of firmware is executed mainly aiming at improving performances of an apparatus. Accordingly, it is preferable to execute such a rewrite process as early as possible. For example, if such a rewrite process is delayed, a print job executed before the rewrite process may turn out to suffer from a poor printing quality such as a poor color shade. Such a print job that has resulted in a poor printing quality in the worst case may need to be executed again. Considering this, as one example, a method may be considered for executing a rewrite process of firmware with a higher priority than print jobs that are in an execution queue, and executing the print jobs upon completion of the firmware rewrite process. In this case, however, execution of these print jobs is delayed for a long time until the firmware rewrite process is completed. This situation gives rise to a great inconvenience to a user who is in a hurry for printing documents. On the other hand, if a rewrite process of firmware is executed with a lower priority than print jobs, the print jobs may turn out to suffer from a poor printing quality such as a poor color shade as described above.

These problems may occur not only to printers but also to any image processing apparatuses such as scanners that execute an image processing job and have the function of rewriting firmware.

SUMMARY OF THE INVENTION

The object of the present invention is to provide an image processing apparatus, an image processing method, and a program that enable both a rewrite process of firmware and an image processing job to be executed without a long delay, with no increase in the cost.

The above object of the present invention is achieved by an image processing apparatus that is connected to a network and that executes an image processing job, including: a memory storing firmware; an image processing job reception unit for receiving an image processing job; a firmware obtaining unit for obtaining new firmware for a rewrite purpose; a firmware rewrite controller for rewriting the firmware stored in the memory to the obtained new firmware; and a job transfer controller for transferring an unexecuted image processing job to another image processing apparatus connected to the network, during a rewrite time period from when the new firmware is obtained to when rewrite to the obtained new firmware is completed, the unexecuted image processing job being at least one of (a) an image processing job that is in a wait state for execution when the new firmware is obtained, and (b) an image processing job that is received during the rewrite time period.

With this construction, rewrite of firmware can be executed promptly, and also, such a case where the user who has requested an image processing job is kept waiting for a long time due to the rewrite of firmware can be avoided.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the drawings:

FIG. 8 is a diagram showing a content example of a register information table;

FIG. 9 is a flowchart showing contents of a subroutine of a firmware transmission process;

FIG. 10 is a schematic diagram showing a content example of an e-mail message generated;

FIG. 12 is a diagram showing a content example of a job management table;

FIG. 22 is a flowchart showing contents of a print job transfer process relating to a modification example of the present invention.

DESCRIPTION OF THE PREFERRED EMBODIMENTS

The following describes preferred embodiments of an image processing apparatus relating to present invention, with reference to the drawings.

First Embodiment 1-1. Overall Construction

Figure 1:
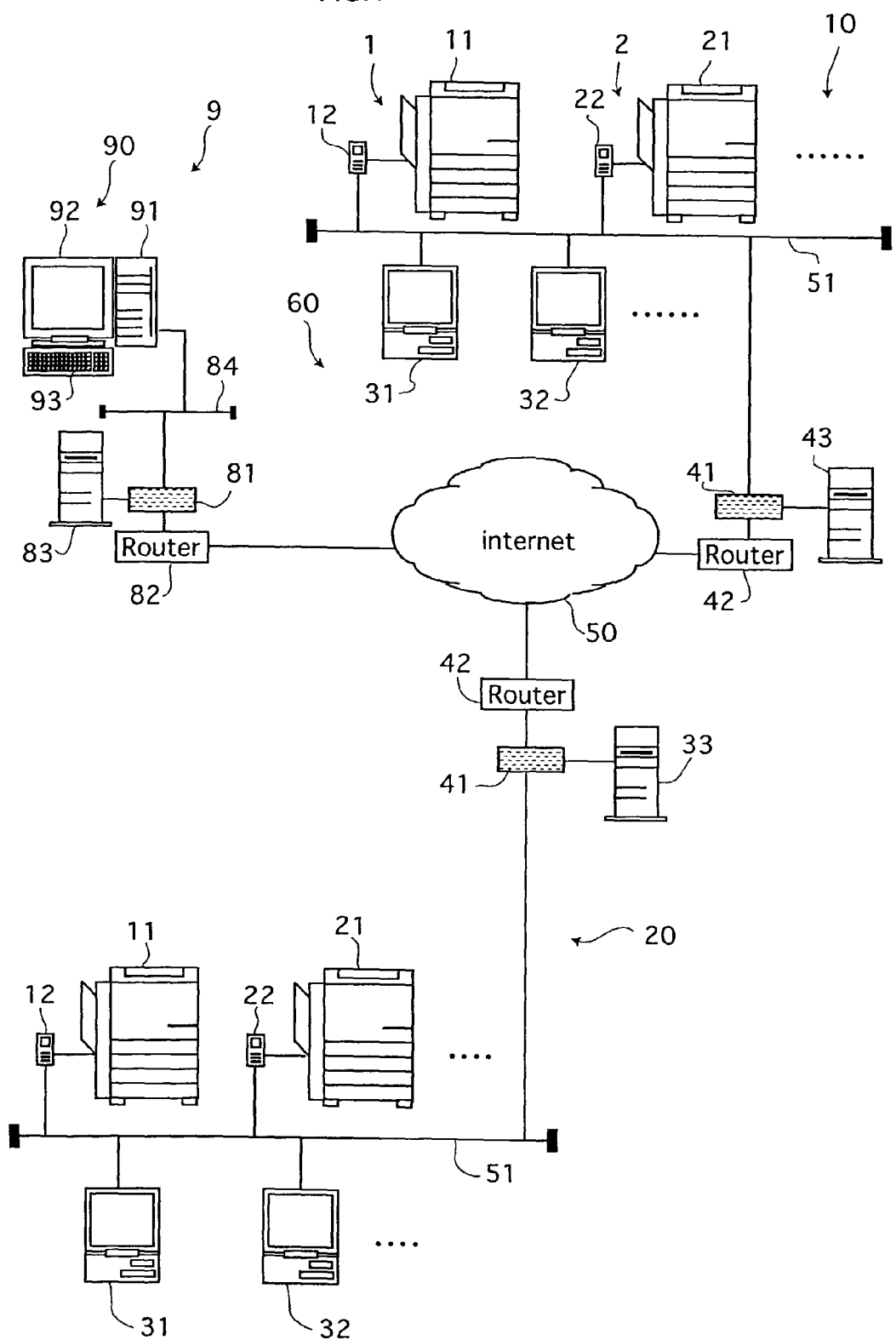
FIG. 1 is a diagram showing a construction of an image processing system that includes an image processing apparatus in a first embodiment of the present invention.

FIG. 1 is a diagram showing a construction of an image processing system 60 (hereafter simply, a "system") that includes an image processing apparatus relating to the present invention.

As shown in the figure, the system is constructed by connecting a personal computer (PC) that is located at a service center 9 for managing firmware, with an apparatus group 10 that is located at an office of a user or the like, via a network, i.e., the internet 50 or the like. The apparatus group 10 is roughly composed of image processing apparatuses 1, 2, . . . , client apparatuses 31, 32, . . . , and the like. Also, an apparatus group 20 that is owned by another user is connected to the Internet 50. Transmission and reception of various data including image data between apparatuses are enabled via the Internet 50 and the like.

Here, "firmware" referred to in the present embodiment is programs incorporated to control hardware. Firmware is incorporated in each module (described later) of an image processing apparatus. Specifically, examples of firmware include basic software executed by each module, such as a boot program, an input-output program, a control program or the like for image processing, a control program or the like for a drive unit, etc., and control data. Firmware is distributed to each image processing apparatus as being attached to an e-mail message in the PC 90.

The client apparatuses 31, 32, . . . , and the image processing apparatuses 1, 2, . . . , are connected via a local area network (LAN) 51.

The client apparatus 31 is realized by a PC, and is capable of issuing a request to the image processing apparatuses 1, 2, . . . , for a process of printing, on a paper sheet, a text or an image generated using application soft for creating texts or graphics (hereafter referred to as a "print job"). It should be noted here that constructions of the other client apparatuses 32, . . . , are the same as the construction of the client apparatus 31.

The image processing apparatus 1 is constructed by connecting an image forming apparatus 11 and a printer controller 12 that is a management apparatus for managing the image forming apparatus 11.

The printer controller 12 receives an execution request of a print job or the like from the client apparatuses 31, 32, . . . via the LAN 51, and instructs the image forming apparatus 11 to execute the received job. As described later, the printer controller 12 downloads e-mail messages (hereafter simply referred to as "mails") at predetermined time intervals from a mail server 43, and obtains, from a mail to which firmware is attached, the firmware. Then, the printer controller 12 instructs the image forming apparatus 11 to execute a job of rewriting firmware incorporated therein to the obtained new firmware (hereafter referred to as a "firmware rewrite job"). If a print job is in an execution queue at that time, the printer controller 12 executes a process of instructing another image processing apparatus to execute the print job. It should be noted here that constructions of printer controllers in other image processing apparatuses 2, . . . are the same as the construction of the printer controller 12.

A router 42 is located at a connection part of the LAN 51 and the Internet 50. The router 42 not only connects the LAN 51 and the Internet 50, but also provides path control. Also, a firewall 41 is provided between the router 42 and each of the image processing apparatuses 1, 2, . . . .

The firewall 41 can function as a packet filtering, a proxy server, and the like. The firewall 41 permits a packet to pass only if a sender IP address (host name), a recipient IP address (host name), a sender port number, a recipient port number, data, and the like satisfy predetermined conditions. Here, the firewall 41 permits communication under SMTP (simple mail transfer protocol) to pass.

Also, the mail server 43 is connected to the LAN 51, and provides services relating to collection and delivery of mails.

On the other hand, at the service center 9, a firewall 81, a router 82, and a mail server 83 are located, in addition to the PC 90. These units are connected to a LAN 84. The firewall 81, the router 82, and the mail server 83 have the same functions as the firewall 41, the router 42, and the mail server 43, respectively.

The apparatus group 20 is composed of apparatuses having the same functions as the apparatuses included in the apparatus group 10. It should be noted here that the apparatuses in the apparatus group 20 that have the same functions as those in the apparatus group 10 are therefore given the same reference numerals, and are not described here.

Hereafter, each apparatus in the system is described in detail. Here, for the image processing apparatuses 1, 2, . . . , that are identical with one another, the following describes only the construction of the image processing apparatus 1. For the client apparatuses 31, 32, . . . , that are identical with one another, the following describes only the construction of the client apparatus 31.

1-2. Construction of the Client Apparatus 31

Figure 2:
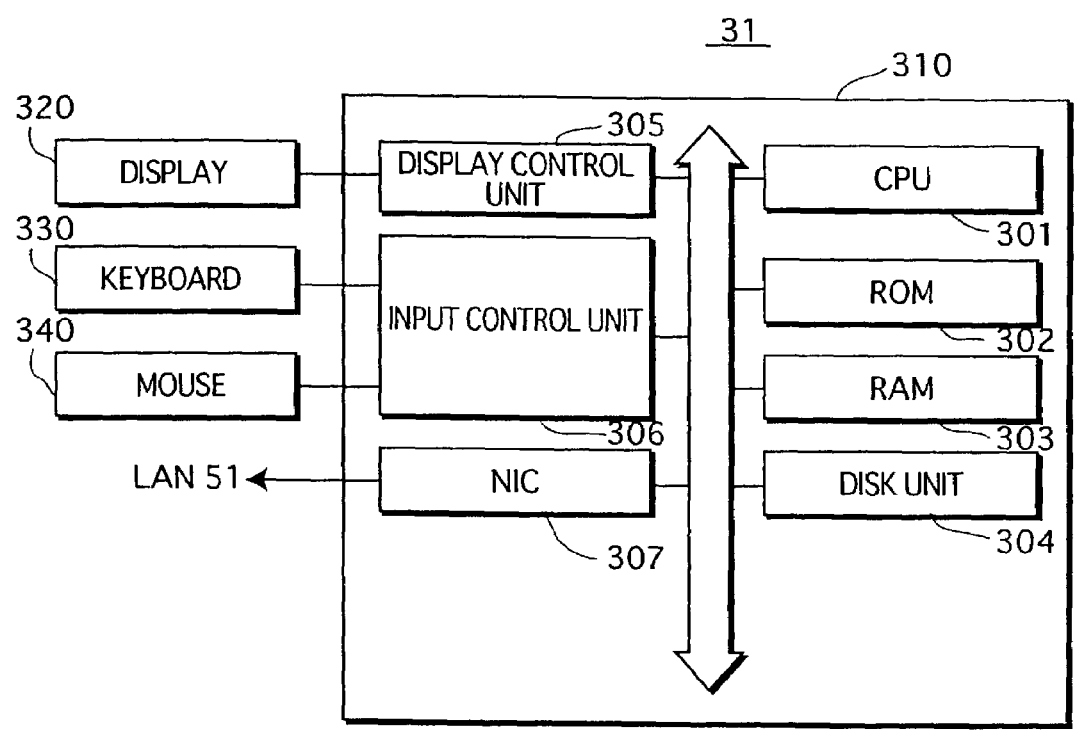
FIG. 2 is a block diagram showing a circuit construction of a client apparatus.

FIG. 2 is a block diagram showing a circuit construction of the client apparatus 31.

As shown in the figure, the client apparatus 31 includes a PC main body 310, a display 320, a keyboard 330, and a mouse 340.

The PC main body 310 includes a CPU 301, a ROM 302, a RAM 303 that provides a work area, and a disk unit 304. In addition to these, the PC main body 310 includes a display control unit 305 for realizing display control of the display 320, an input control unit 306 for receiving an input of a signal from the keyboard 330 and the mouse 340, and a network interface card (NIC) 307 for transmitting and receiving various data to and from the image processing apparatus 1 and the like via the LAN 51.

The ROM 302 stores application programs for document editing and image editing, a printer driver, and the like. The CPU 301 executes these programs and the like.

The printer driver generates data (data for a print job) by adding, as a header, job control information and page control information as control information necessary for printing, to data of a text or an image to be printed out (print data).

Here, job control information includes information showing a job sender name, an ID of the apparatus (user ID), and the number of copies to be printed out. Page control information includes information showing a paper size for printing, information indicating color or monochrome for printing, and paper feed information showing which paper feed tray is used to feed a paper for printing. Print data is obtained by converting data generated using each application program into data (written in a page description language (PDL)) that can be recognized by the printer controllers 12, 22, . . . .

The CPU 301 receives an instruction for printing by an input made by the user operating the keyboard 330 or the like, and transmits data for the print job to an image processing apparatus designated as a recipient by the user, to make the image processing apparatus execute the print job. Hereafter, a process of transmitting data for a print job so as to make the print job executed is referred to as a "print job transmission process", a process of receiving the transmitted data for the print job as a "print job reception process", and a process of transferring the received data for the print job to another apparatus as a "print job transfer process".

The disk unit 304 is a nonvolatile memory such as a hard disk, and stores generated text data, various information including a mail address of each of the image processing apparatuses 1, 2, . . . , and the like.

1-3. Construction of the Image Processing Apparatus 1

The image processing apparatus 1 has various functions of executing a copy job of reading an image of a document set and printing the image on a paper sheet, executing an image information transmission job of attaching the read image information of the document to a mail and transmitting the mail to a recipient designated by the user, and the like, in addition to the function of executing a print job requested by the client apparatuses 31, 32, . . . . The image processing apparatus 1 is a so-called a multiple function peripheral (MFP).

The following describes the constructions of the image forming apparatus 11 and the printer controller 12 included in the image processing apparatus 1.

1-3-1. Construction of the Image Forming Apparatus 11

Figure 3:
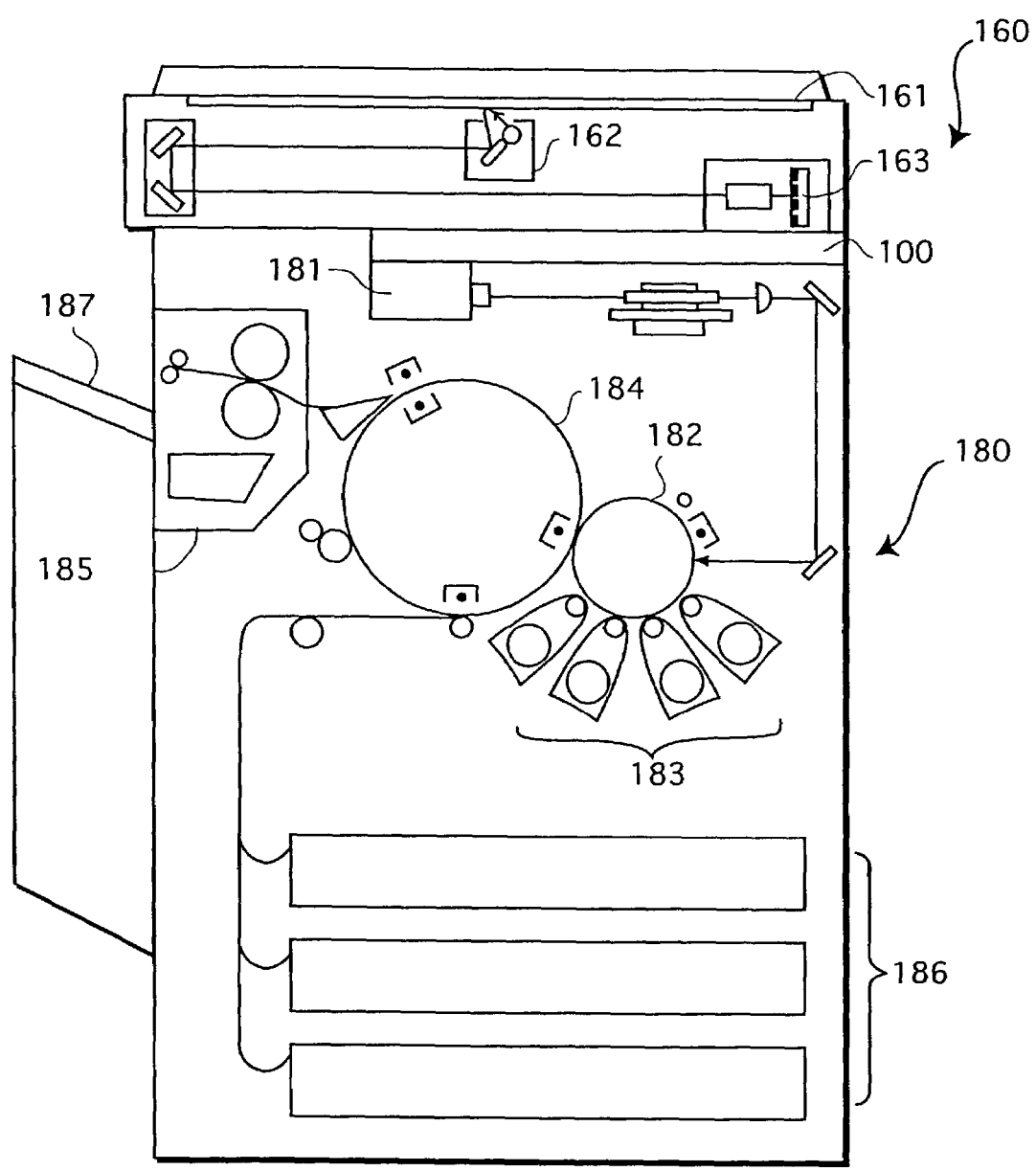
FIG. 3 is a diagram showing a construction of an image forming apparatus.

FIG. 3 is a diagram showing the construction of the image forming apparatus 11.

The image forming apparatus 11 executes an image formation using well-known electrophotography. The image forming apparatus 11 is roughly composed of an image reader (IR) unit 160 that reads a document image, and a printer unit 180 that prints an image on a paper sheet based on image data read by the IR unit 160, or based on image data transmitted from the client apparatuses 31, 32, . . . , via the LAN 51.

The IR unit 160 includes a scanner 162 that scans a document set on platen glass 161 by illuminating the document, and a CCD sensor 163 that receives light reflected from the document and subjects the received light to photoelectric conversion. A signal resulting from the photoelectric conversion by the CCD sensor 163 is transmitted to a control unit 100 as image data.

The printer unit 180 includes a print head 181, a photoconductive drum 182, a developing unit 183, a transfer drum 184, a fixing unit 185, and a paper feed unit 186.

The print head 181 emits a laser beam based on a drive signal transmitted from the control unit 100, to expose a surface of the photoconductive drum 182. Due to the exposure, an electrostatic latent image is formed on the photoconductive drum 182. The electrostatic latent image is formed by developing units of respective colors, cyan (C), magenta (M), yellow (Y), and black (K) in the developing unit 183 sequentially developing respective colors to form toner images. On the other hand, the paper feed unit 186 feeds a paper toward the transfer drum 184, so that the paper is rolled up around the transfer drum 184. The toner images of respective colors formed on the photoconductive drum 182 are transferred over one after another onto the paper rolled up on the transfer drum 184. When the transfer is completed, the paper is detached from the transfer drum 184, and is transported to the fixing unit 185. The toner images on the paper are fixed onto the paper by a heater (not shown) provided in the fixing unit 185. The paper that has passed through the fixing unit 185 is discharged onto a paper discharge tray 187 that is provided external to the apparatus. The operation controls of the IR unit 160 and the printer unit 180 are performed by the control unit 100.

1-3-2. Construction of the Control Unit 100

Figure 4:
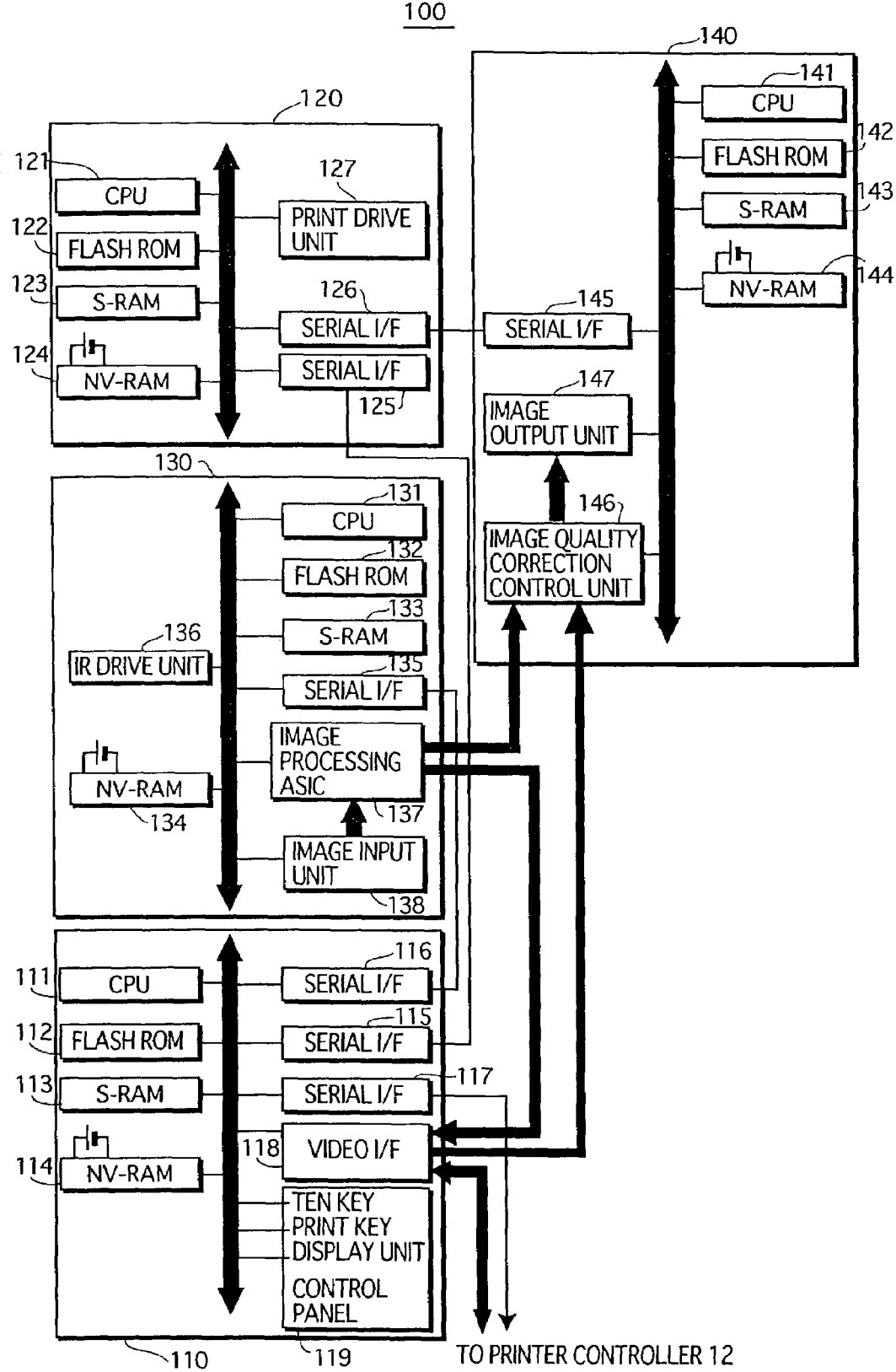
FIG. 4 is a block diagram showing a circuit construction of a control unit of the image forming apparatus.

FIG. 4 is a block diagram showing a circuit construction of the control unit 100.

As shown in the figure, the control unit 100 is controlled by multicentral processing units (CPU). The control unit 100 includes four control modules 110 to 140 corresponding to the CPUs. Here, a "module" is a functional block that executes a control function of a CPU or a control circuit including a CPU.

The control module 110 includes a CPU 111, a flash ROM 112, an S-RAM 113 that constitutes a work area, an NV-RAM 114, serial I/Fs 115, 116, and 117, a video I/F 118, and a control panel 119.

The CPU 111 transmits and receives a control command and the like to and from the control modules 120 to 140 and performs an overall control of the image forming apparatus 11.

The flash ROM 112 is a nonvolatile memory whose recorded contents can be electrically rewritable. The flash ROM 112 stores firmware for operations of the CPU 111.

The NV-RAM 114 is a memory storing various set values.

The serial I/F 115 is an interface that transmits and receives a control command and the like to and from the control module 120. The serial I/F 116 is an interface that transmits and receives a control command and the like to and from the control module 130.

The serial I/F 117 is an interface that transmits and receives a control command and the like to and from the printer controller 12.

The control panel 119 includes keys for receiving an input to select a copy job, an image information transmission job, etc., i.e., a ten key and a print key, and a display unit that displays input contents and the like. The control panel 119 is provided at such a location that allows the user to operate easily.

The video I/F 118 receives image data for executing a print job requested by the printer controller 12, and outputs the received image data to the control module 140.

It should be noted here that when image data of a read document is transmitted from the control module 130 to the video I/F 118 at the execution of an image information transmission job, the CPU 111 executes a process of attaching the image data to a mail forwarded to a recipient designated by the user, and transmitting the image data from the video I/F 118 to the printer controller 12.

Also, the CPU 111 transmits to the printer controller 12, a "busy" signal when a job such as a print job and a firmware rewrite job is presently being executed, and a "ready" signal when execution of a new job is possible.

The control module 120 includes a CPU 121, a flash ROM 122, an S-RAM 123 that constitutes a work area, an NV-RAM 124 that stores various set values, serial I/Fs 125 and 126, and a print drive unit 127.

The serial I/F 125 is an interface that transmits and receives a control command and the like to and from the control module 110. The serial I/F 126 is an interface that transmits and receives a control command and the like to and from the control module 140.

The print drive unit 127 is a drive control circuit that performs drive control of units that relate to image formation operations, such as the photoconductive drum 182.

The CPU 121 issues, to the print drive unit 127, operation instructions of units that relate to image formation operations, such as the photoconductive drum 182, and performs an overall control of a print process.

The flash ROM 122 is a nonvolatile memory that is the same as the above flash ROM 112, and stores firmware for operations of the CPU 121.

The control module 130 includes a CPU 131, a flash ROM 132, an S-RAM 133 that constitutes a work area, an NV-RAM 134 that stores various set values, a serial I/F 135, an IR drive unit 136, an image processing ASIC 137, and an image input unit 138.

The serial I/F 135 is an interface that transmits and receives a control command and the like to and from the control module 110.

The IR drive unit 136 is a drive control circuit that performs drive control of units that relate to document reading operations, such as the IR unit 160 and the scanner 162.

The image input unit 138 drives the CCD sensor 163 of the IR unit 160, and outputs image data of a document that has been subjected to photoelectric conversion, to the image processing ASIC 137.

The image processing ASIC 137 subjects the image data from the image input unit 138 to various image processing including shading correction, MTF correction, density correction, and binarization processing such as error diffusion. Then, the image processing ASIC 137 outputs the resulting image data to the control module 140 in the case of a copy job, and to the control module 110 in the case of an image information transmission job.

The CPU 131 issues an instruction for scan operations or the like, to the IR drive unit 136, and performs an overall control of a document image reading process.

The flash ROM 132 is a nonvolatile memory that is the same as the above flash ROM 112, and stores firmware for operations of the CPU 131.

The control module 140 includes a CPU 141, a flash ROM 142, an S-RAM 143 that constitutes a work area, an NV-RAM 144 that stores various set values, a serial I/F 145, an image quality correction control unit 146, and an image output unit 147.

The image quality correction control unit 146 subjects image data from the control modules 110 and 130 to image quality correction processing such as smoothing and halftone reproduction, and outputs the resulting image data to the image output unit 147.

The image output unit 147 drives units including the print head 181, based on the image data output from the image quality correction control unit 146, and scans and exposes the photoconductive drum 182.

The CPU 141 issues an instruction for an image correction process and the like, to the image quality correction control unit 146 and the like, and performs overall controls of an image correction process and an output process of the corrected image data.

The flash ROM 142 is a nonvolatile memory that is the same as the above flash ROM 112, and stores firmware for operations of the CPU 141.

The serial I/F 145 is an interface that transmits and receives a control command and the like to and from the control module 120.

It should be noted here that the present embodiment assumes a case where a copy job and an image information transmission job can be received even when a print job is presently being executed. For example, a copy job can be received in the following way. While a print job is being executed, a document is set, information including the number of copies to be made is input, and a print key is pressed. By doing so, a print process is executed automatically by reading a document, upon completion of the print job. To be more specific, the CPU 111 transmits a signal showing that a copy job has been received, to the printer controller 12. The printer controller 12 registers the copy job, as an unexecuted job, into a job management table 211 (see FIG. 12) as described later. When an execution turn of the job comes, the printer controller 12 instructs the CPU 111 to execute the job. The same also applies to the case of an image information transmission job.

1-3-3. Construction of the Printer Controller 12

Figure 5:
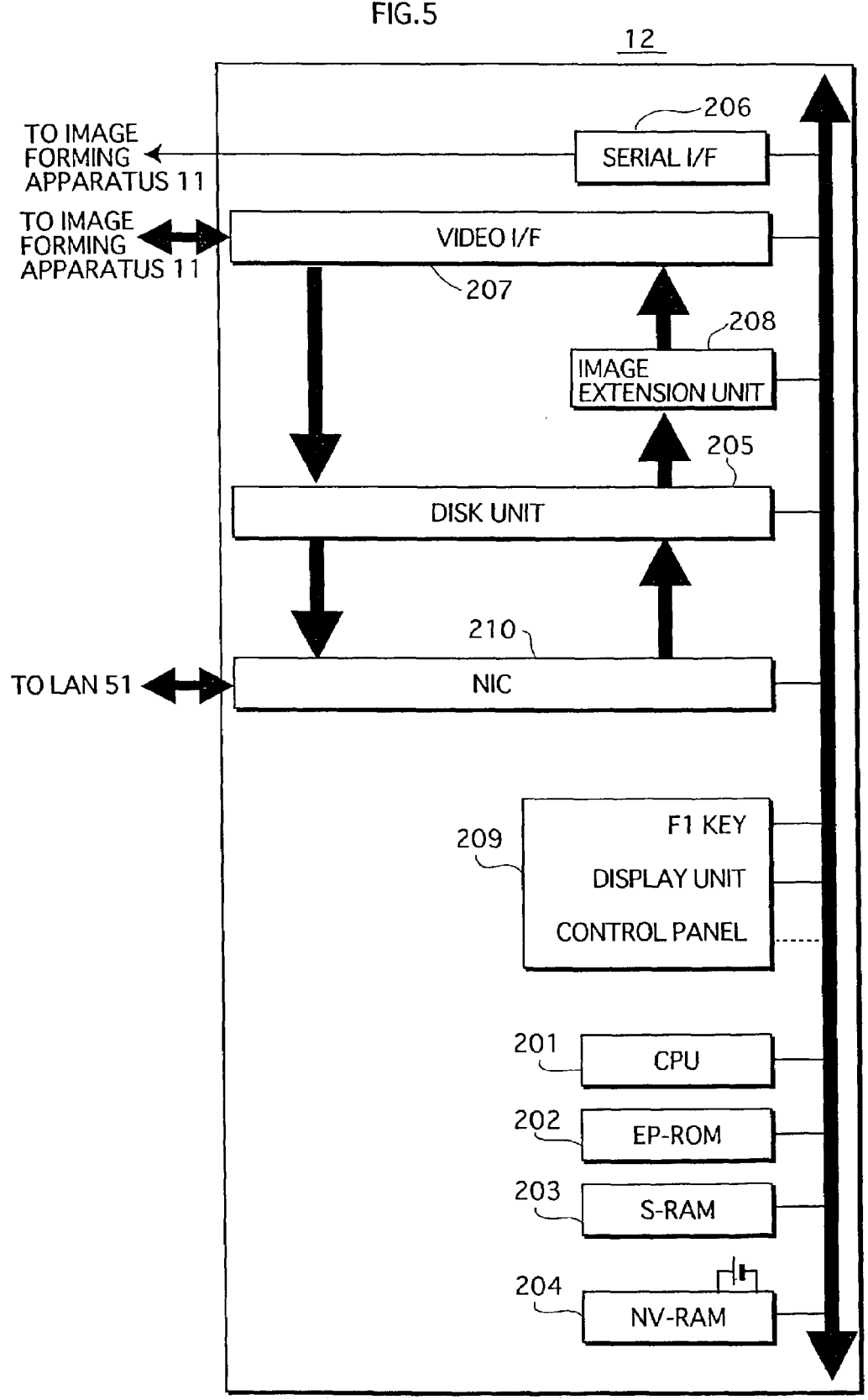
FIG. 5 is a block diagram showing a circuit construction of a printer controller.

FIG. 5 is a block diagram showing a circuit construction of the printer controller 12.

As shown in the figure, the printer controller 12 includes a CPU 201, an EP-ROM 202, an S-RAM 203 that provides a work area, an NV-RAM 204, a disk unit 205, a serial I/F 206, a video I/F 207, an image extension unit 208, a control panel 209, and an NIC 210.

The CPU 201 receives a print job from the client apparatus 31 and the like, manages an execution order of a print job, a copy job, and an image information transmission job in the image forming apparatus 11, controls transmission and reception of mails, manages firmware obtained from a received mail, controls image processing of a print image, instructs the image forming apparatus 11 to execute a firmware rewrite job, and executes a process of transferring a print job that is in an execution queue when firmware is obtained, to another image processing apparatus.

The EP-ROM 202 is a nonvolatile memory and stores control programs for operations of the CPU 201.

The NIC 210 receives a print job from the client apparatus 31 and the like, transfers a print job to another image processing apparatus 2, or the like, via the LAN 51.

The disk unit 205 is a nonvolatile memory that is constructed by a hard disk or the like. The disk unit 205 temporarily stores a print job received in the NIC 210, firmware obtained from a mail, a mail transmitted from the image forming apparatus 11 by execution of an image information transmission job. The stored print job is transmitted to the image extension unit 208 by the CPU 201 when its execution timing comes. Also, firmware is transmitted to the image forming apparatus 11 via the serial I/F 206, without going through the image extension unit 208. Also, the mail by the image information transmission job is transmitted via the NIC 210 to an apparatus designated as a recipient.

The image extension unit 208 extends print data written in a PDL included in a received print job, to generate bitmap data (image data), and transmits the generated bitmap data to the image forming apparatus 11 via the video I/F 207.

The serial I/F 206 is connected to the serial I/F 117 of the image forming apparatus 11, and is used as an interface for transmitting and receiving a control command and transmitting firmware to and from the control module 110.

The video I/F 207 is connected to the video I/F 118 of the image forming apparatus 11, and is used as an interface for transmitting and receiving image data and the like to and from the control module 110.

The control panel 209 includes F1 key and a ten key used to perform communication setting that is described later, and a display unit for displaying contents of the communication setting and the like. The control panel 209 also includes a registration key used to register a user ID of a client apparatus. The user uses this registration key to enter into a registration menu. With the registration menu, the user can input and register the user ID by operating the ten key and the like. The input user ID is stored in a table provided within the NV-RAM 204 (hereafter referred to as a "permitted ID table"). As described later, a print job transmitted from a client apparatus cannot be transferred to another image processing apparatus if the user ID of the client apparatus is not registered in the table. This means that the print job is executed by the image forming apparatus 11 if the user ID of the client apparatus is not registered in the table.

The NV-RAM 204 stores various set values, a job management table 211, and a permitted ID table, and the like. Also, in addition to a mail address of the apparatus, the NV-RAM 204 stores a mail address of the mail server 43 that becomes necessary when mails forwarded to the apparatus are downloaded from the mail server 43, and mail addresses of the other image processing apparatuses 2, . . . .

It should be noted here that each of the printer controllers 12, 22, . . . , has a management information base (MIB) that shows information of the apparatus (image processing apparatus) including the construction and the state of the apparatus, and can obtain the MIB using SNMP (simple network management protocol). Here, at least information showing reproducible colors for printing, resolution for printing, an installment location of the apparatus, a data amount of its unexecuted jobs is obtained regularly from each of the other image processing apparatuses as "image processing apparatus's attribute information". The obtained information is used to select an image processing apparatus to which a print job is transferred in a print job transfer process that is described later.

With the construction described above, the control modules 110 to 140 normally transmit and receive, among the CPUs, a control command and the like via each serial I/F. On the other hand, when an instruction to rewrite firmware is issued from the printer controller 12, firmware data is transmitted and received via each serial I/F. In this way, a serial I/F whose transmittable data amount per unit time is small is used to transmit large-capacity firmware because newly providing a special transmission line dedicated to rewrite of firmware on a control substrate is virtually impossible due to a drastic cost increase. Accordingly, when firmware is transmitted, the time taken for transmission increases as the data amount of the firmware increases.

It should be noted here that the flash ROM 112 storing firmware and the CPU 111 are placed physically close to each other. Due to this, loading of a program into the CPU 111 can be performed promptly at the time when power is turned on. Also, an influence of noise can be alleviated during loading of a program. The same also applies to the CPU and the flash ROM in each of the other control modules 120 to 140.

On the other hand, to facilitate transfer of image data, a data bus that can transmit data at high speed is used to realize a communication line for image data used when the image processing apparatus 1 executes a print job requested by the client apparatus 31 and the like. To be more specific, the data bus is used to realize the communication line connecting the NIC 210, the disk unit 205, the image extension unit 208, the video I/F 207, the video I/F 118 in the control module 110, the image quality correction control unit 146 in the control module 140, and the image output unit 147 in the control module 140. The same applies to a communication line connecting the image input unit 138 in the control module 130, the image processing ASIC 137 in the control module 130, and the image quality correction control unit 146 in the control module 140.

1-4. Construction of the Service Center 9

Figure 6:
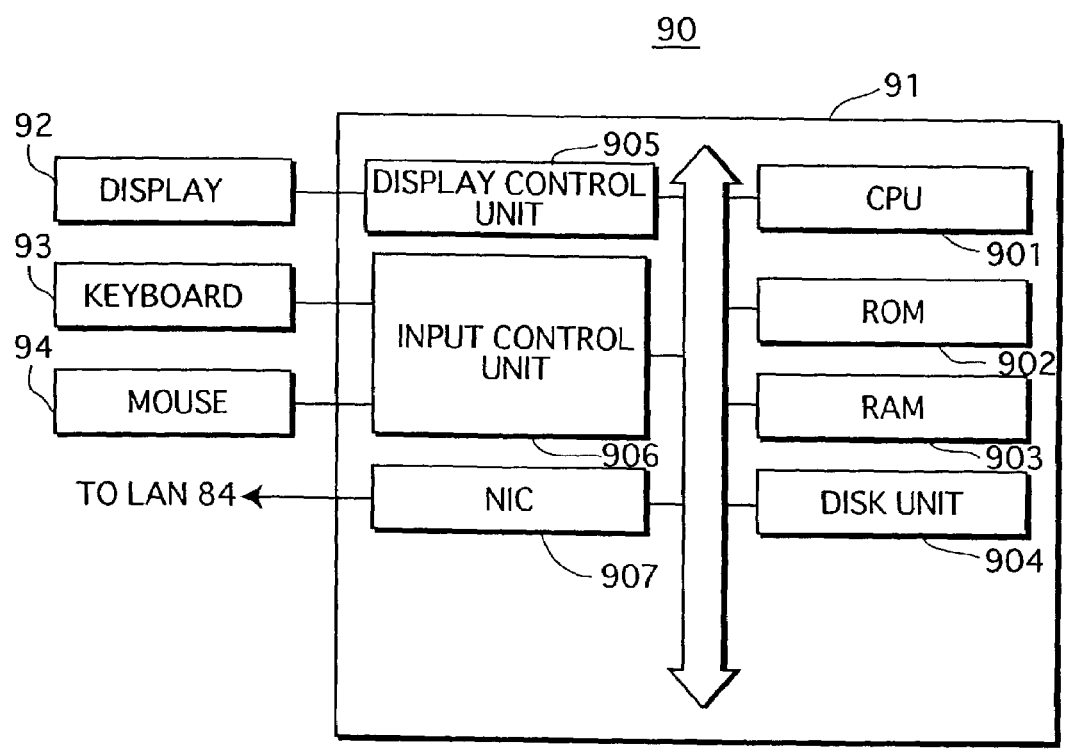
FIG. 6 is a block diagram showing a circuit construction of a PC located at a service center.

FIG. 6 is a block diagram showing a circuit construction of the PC 90 located at the service center 9.

As shown in the figure, the PC 90 includes a PC main body 91, a display 92, a keyboard 93, and a mouse 94.

The PC main body 91 includes a CPU 901, a ROM 902, a RAM 903 that provides a work area, and a disk unit 904. In addition to these, the PC main body 91 includes a display control unit 905 that performs display control of the display 92, an input control unit 906 that receives an input of a signal from the keyboard 93 and the mouse 94, and an NIC 907 for transmitting firmware and the like to the image processing apparatus 1 and the like via the LAN 84.

The disk unit 904 is a nonvolatile memory such as a hard disk, and stores information including a model name and a mail address of each of the image processing apparatuses 1, 2, . . . , and firmware for each image processing apparatus. Firmware is stored in a separate folder (directory) for each apparatus and for each control module.

The CPU 901 manages firmware, controls transmission and reception of mails, and executes a process of attaching firmware to a mail and transmitting the mail to each of the image processing apparatuses 1, 2, . . . .

The ROM 902 stores a control program for a firmware transmission process executed by the CPU 901 and the like.

The keyboard 93 includes F1 to F3 keys used for inputting various setting and registration such as communicating setting. It should be noted here that the contents of the setting and registration are described later.

1-5. Operation Contents of the PC 90 at the Service Center 9

Figure 7:
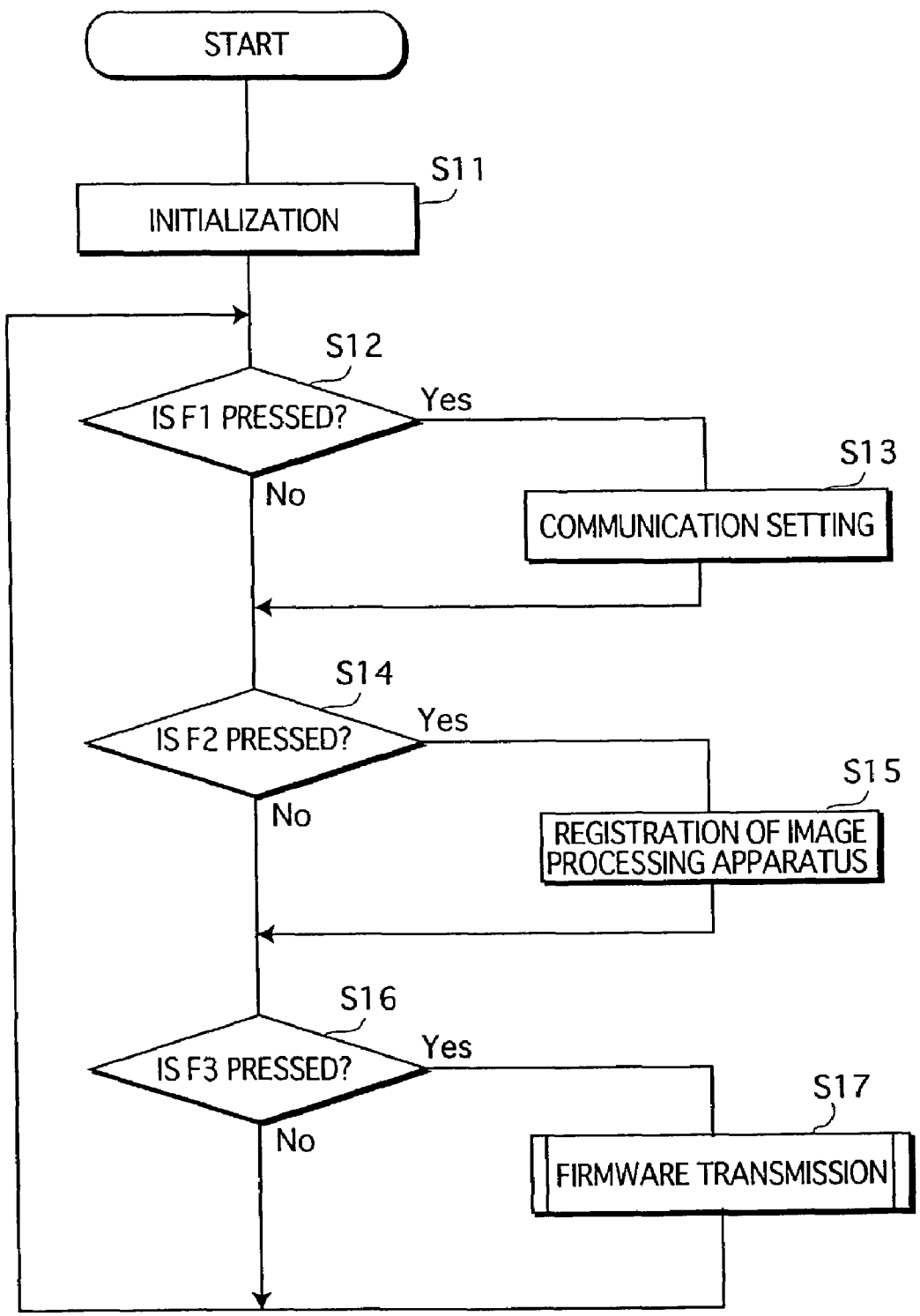
FIG. 7 is a flowchart showing contents of a process executed by a CPU of the PC.

FIG. 7 is a flowchart showing the operation contents of the CPU 901 in the PC 90.

As shown in the figure, when power is turned on, the CPU 901 first executes an initialization process including an initialization of the RAM 903 and other internal memories, and an initialization of parameters and the like (step S11).

Processing described below is executed in accordance with a key operation of F1 to F3 keys.

When judging that F1 key is pressed ("Yes" in step S12), the CPU 901 performs communication setting (step S13).

The communication setting is to set a parameter for transmitting a mail. To be more specific, when F1 key is pressed, the CPU 901 makes the display 92 display an input screen for communication setting. When mail addresses of the apparatus (PC 90) and the mail server 83 are input by a manager, the CPU 901 makes the disk unit 904 store the input information. When the communication setting is completed, the processing advances to step S14.

When judging that F2 key is pressed ("Yes" in step S14), the CPU 901 executes a registration process of an image processing apparatus (step S15).

To be more specific, when F2 key is pressed, the CPU 901 makes an input screen for registration displayed. When information such as a model name, a mail address of an image processing apparatus to which firmware is to be transmitted, information such as a user name, an address, a telephone number of a user that owns the image processing apparatus is input by the manager, the CPU 901 makes the input information registered in the register information table 96 within the disk unit 904.

FIG. 8 is a diagram showing a content example of the register information table 96.

As shown in the figure, the register information table 96 includes various information fields such as a "model" field, an "e-mail address" field, and an "other information" field, and a model name, a mail address, etc., of an apparatus are stored therein in association with the apparatus. When transmitting firmware, the CPU 901 refers to the register information table 96 to obtain a mail address of an image processing apparatus to which the firmware is to be transmitted. Referring back to FIG. 7, when the registration process in step S15 is completed, the processing advances to step S16.

When judging that F3 key is pressed ("Yes" in step S16), the CPU 901 executes a firmware transmission process (step S17), and the processing returns to step S12.

FIG. 9 is a flowchart showing contents of a subroutine of the firmware transmission process.

As shown in the figure, the CPU 901 makes the display 92 display an input screen for inputting a model name of an image processing apparatus to which firmware is to be transmitted, and a control module number of a rewrite target control module. The CPU 901 receives an input of the model name and the control module number by the manager (step S21).

The CPU 901 then counts the number of image processing apparatuses "n" registered in the register information table 96 (step S22), and sets "1" at a loop counter "i" (step S23).

In step S24, the CPU 901 compares a value of "i" and a value of "n". Here, a value of "i" is assumed to be "1". Therefore, the CPU 901 judges that a condition "i≦n" is met ("Yes" in step S24), and reads a model name registered at the i-th record, i.e., at the first record here, in the register information table 96 (step S25). When the read model name matches the model name input in step S21 ("Yes" in step S26), the CPU 901 reads a mail address of the image processing apparatus from the register information table 96 (step S27). Then, the CPU 901 identifies firmware to be transmitted using the model name and the control module number input in step S21, designates a directory storing the identified firmware within the disk unit 904, reads the firmware, and generates a mail to which the read firmware is attached and having the read mail address as a recipient address (step S28).

FIG. 10 is a schematic diagram showing a content example of a generated mail.

As shown in the figure, the mail message is composed of a header and a body as specified by RFC (request for comments) that are the standards relating to a mail message specified by the IETF (Internet Engineering Task Force). The header contains information relating to a recipient and the like, and the body contains firmware.

Here, the field "Subject" in the header contains a character string obtained by connecting, using an under bar, a model name and a control module number that are input by the manager and that indicate firmware to be transmitted (here, "model1_1").

The field "Content-Description" contains "Firmware" for indicating that firmware is attached to the mail.

It should be noted here that RFC prohibits binary data from being directly written in a mail message. Therefore, the CPU 901 converts firmware that is originally made up of binary data into US-ASCII code using the well-known base 64 format, and writes the converted firmware into a lower part of the field "Content-Transfer-Encoding" that is provided for indicating a conversion format of binary data.

Referring back to FIG. 9, in step S29, the CPU 901 transmits the generated mail. The CPU 901 establishes connection with the mail server 83 using TCP/IP (transmission control protocol/internet protocol), and transmits the mail to the mail server 83 using SMTP (simple mail transfer protocol). The mail transmitted to the mail server 83 is distributed via the Internet 50 to a recipient read in step S27.

When the model name read in step S25 does not match the model name input in step S21 ("No" in step S26), transmission of firmware does not need to be performed, and so the processing advances to step S30.

In step S30, the CPU 901 increments a value of the loop counter, here, "i"=1, by one, and the processing returns to step S24.

In step S24, the CPU 901 judges whether a condition "2≦n" is met. When the condition "2≦n" is met, the CPU 901 executes processing from steps S25 to S30 for an apparatus registered at the second record in the register information table 96.

The CPU 901 repeats the processing from steps S25 to S30 and transmits mails one after another until a condition "i≦n" is no longer met in step S24. When judging that the condition "i≦n" is no longer met ("No" in step S24), the CPU returns the processing to a main routine. This results in firmware identified using a module number designated in image processing apparatuses with the same module name being transmitted to the corresponding image processing apparatuses registered in the register information table 96.

1-6. Operation Contents of the Printer Controller 12

Figure 11:
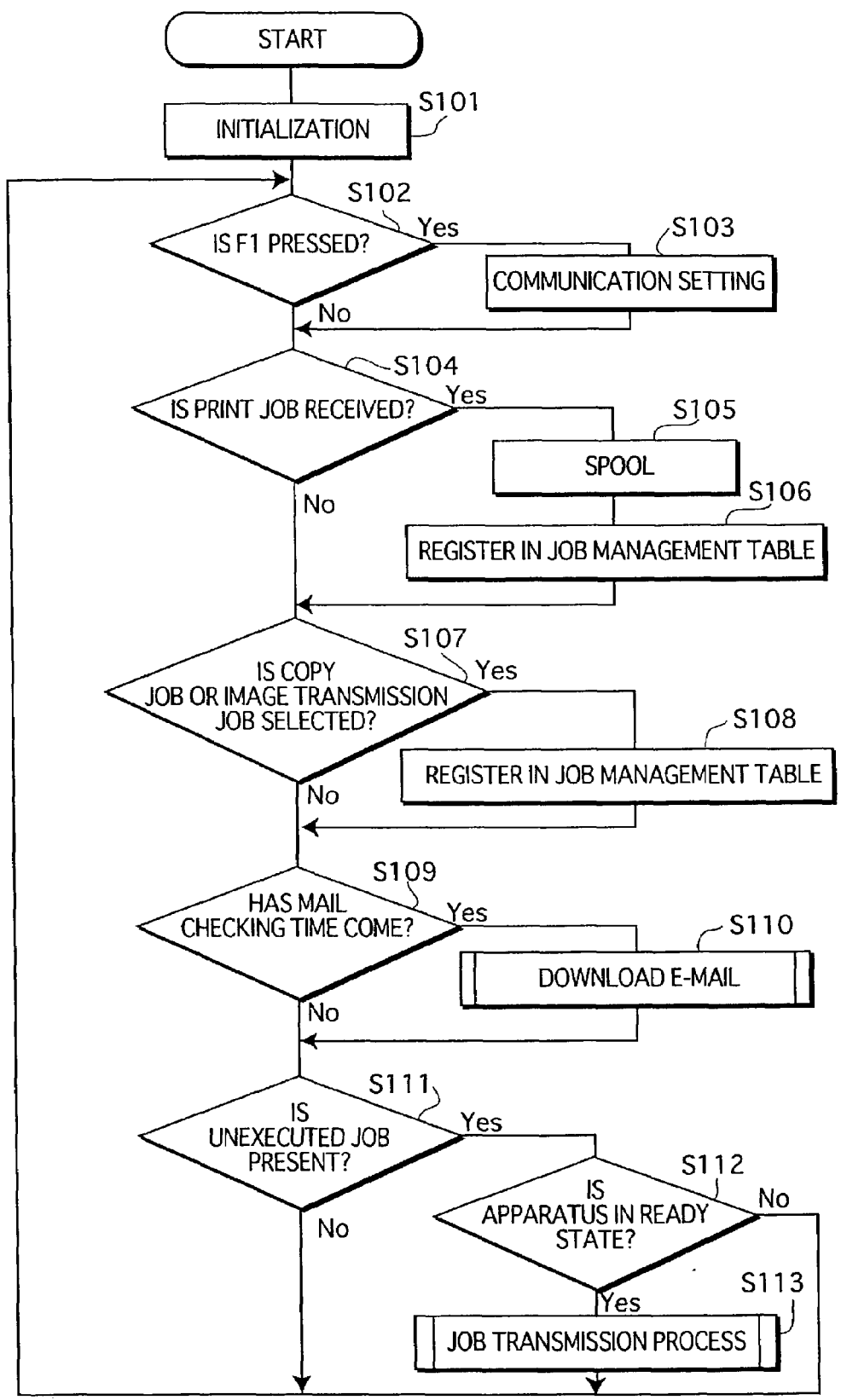
FIG. 11 is a flowchart showing contents of a process executed by a CPU of the printer controller.

FIG. 11 is a flowchart showing the operation contents of the CPU 201 of the printer controller 12.

As shown in the figure, when power is turned on, the CPU 201 first executes an initialization process including an initialization of the S-RAM 203 and other internal memories, and an initialization of parameters and the like (step S101).

The CPU 201 then judges whether F1 key on the control panel 209 is pressed or not. When judging that F1 key is not pressed ("No" in step S102), the CPU 201 advances the processing to step S104. On the other hand, when judging that F1 key is pressed ("Yes" in step S102), the CPU 201 performs communication setting for transmission and reception of mails (step S103). Here, the CPU 201 makes the display unit of the control panel 209 display an input screen for communication setting. When mail addresses of the mail server 43, the image processing apparatuses 1, 2, ..., and the like, a time interval at which the CPU 201 regularly checks whether newly arrived mails forwarded to the image processing apparatus 1 are present or not (hereafter referred to as an "interval T"), and the like, are input by the user, the CPU 201 makes the NV-RAM 204 store the input information. When the communication setting is completed, the processing advances to step S104.

In step S104, the CPU 201 judges whether a print job has been received from the client apparatuses 31, 32, . . . , or not. When judging that no print job has been received ("No" in step S104), the CPU 201 returns the processing to step S107. On the other hand, when judging that a print job has been received ("Yes" in step S104), the CPU 201 spools data for the received print job. Specifically, the CPU 201 temporarily stores the data into the disk unit 205 here (step S105). Along with this, the CPU 201 refers to job control information and the like that indicate the contents of the print job, and registers the contents of the print job into the job management table 211 (step S106).

FIG. 12 is a diagram showing a content example of the job management table 211.

As shown in the figure, the job management table 211 includes a "job number" field, a "job type" field, an "additional information" field, a "memory address" field, a "client name" field, and a "deletion flag" field. Every time when a new job is received, information showing contents of the received new job is registered below the present last record. Accordingly, a job number for each job indicates the reception order of the job.

In the "job type" field, information showing a type of a job is written. For example, when a print job is received from the client apparatuses 31, 32, . . . , information indicating a print job is written therein. When a signal indicating reception of a copy job or an image information transmission job is received from the image forming apparatus 11, information indicating a name of the job is written therein. Also, when firmware is received from the service center 9, information indicating a firmware rewrite job is written therein in step S131 that is described later.

In the "additional information" field, various information such as a user ID, a paper size for printing, and the like, included in job control information and page control information and is written in the case of a print job, and a model name of a rewrite target and its module number are written in the case of a firmware rewrite job. Also, in the case of a copy job and an image information transmission job, information indicating that the job comes from the image forming apparatus 11 is written in the "additional information" field.

In the "memory address" field, a storage address of a received print job or received firmware in the disk unit 205 is written. In the "client" field, an IP address of a client apparatus that has transmitted a print job is written. Also, in the case of a copy job and an image information transmission job, an address of the image forming apparatus 11 is written therein.

In the "deletion flag" field, a value "1" is written as a flag indicating that a job has already been transferred when a print job has been transferred to another image processing apparatus in a job transmission process in step S113 that is described later. Before the value is written therein, the "deletion flag" field remains blank.

This job management table 211 is used to manage an execution order of jobs. The CPU 201 instructs the image forming apparatus 11 to execute jobs in the order of their job numbers. Every time after instructing to execute one job, the CPU 201 deletes the corresponding job from the job management table 211. Therefore, jobs remaining in the job management table 211 are unexecuted jobs that have been placed in an execution queue.

Referring back to FIG. 11, in step S107, the CPU 201 judges whether a signal indicating reception of a copy job or an image information transmission job has been received from the image forming apparatus 11 or not. When judging that such a job has not been received ("No" in step S107), the CPU advances the processing to step S109. On the other hand, when judging that such a job has been received ("Yes" in step S107), the CPU 201 executes a process of registering information showing contents of the received job into the job management table (step S108), and the CPU 201 advances the processing to step S109.

In step S109, the CPU 201 judges whether a time at which the presence of newly arrived mails forwarded to the apparatus is checked has come or not. Here, the CPU 201 communicates with the mail server 43 at every interval T set in the communication setting in step S103 to check the presence of newly arrived mails. Therefore, the CPU 201 judges whether the time has come or not, by judging whether the interval T has passed since the end of the previous communication with the mail server 43.

When judging that the interval T has not passed ("No" in step S109), the CPU 201 advances the processing to step S111. On the other hand, when judging that the interval T has passed ("Yes" in step S109), the CPU 201 executes an e-mail download process (step S110). This download process is, as described in detail later, to register a firmware rewrite job of rewriting firmware into the job management table 211 if the firmware is attached to any of downloaded mails, and transfer a print job that is judged as transfer-possible, out of print jobs that are in an execution queue, to another image processing apparatus.

In step S111, the CPU 201 judges whether a job is registered in the job management table 211 or not, i.e., whether an unexecuted job is present or not.

When judging that an unexecuted job is present ("Yes" in step S111), the CPU 201 judges whether the image forming apparatus 11 is in a ready-state (a state of executing no job and so capable of executing a new job) or not. This judgment is performed by judging whether a ready signal or a busy signal has been transmitted from the CPU 111. When judging that the ready signal has been received, i.e., that the apparatus is in the ready-state ("Yes" in step S112), the CPU 201 executes a job transmission process (step S113). The job transmission process is, as described in detail later, to instruct the image forming apparatus 11 to execute a job registered at the first record in the job management table 211.

When judging that no unexecuted job is present, i.e., that no job is registered in the job management table 211 ("No" in step S111), the CPU 201 returns the processing to step S102. Also, in step S112, when judging that the image forming apparatus 11 is not in the ready-state, i.e., that the busy signal has been received, the CPU 201 returns the processing to step S102. In this case, when judging that one cycle of the routine has been executed and the image forming apparatus 11 is in the ready-state in step S112, the CPU 201 executes the job transmission process in step S113.

The following describes the contents of subroutines of the e-mail down load process in step S110 and the job transmission process in step S113.

Figure 13:
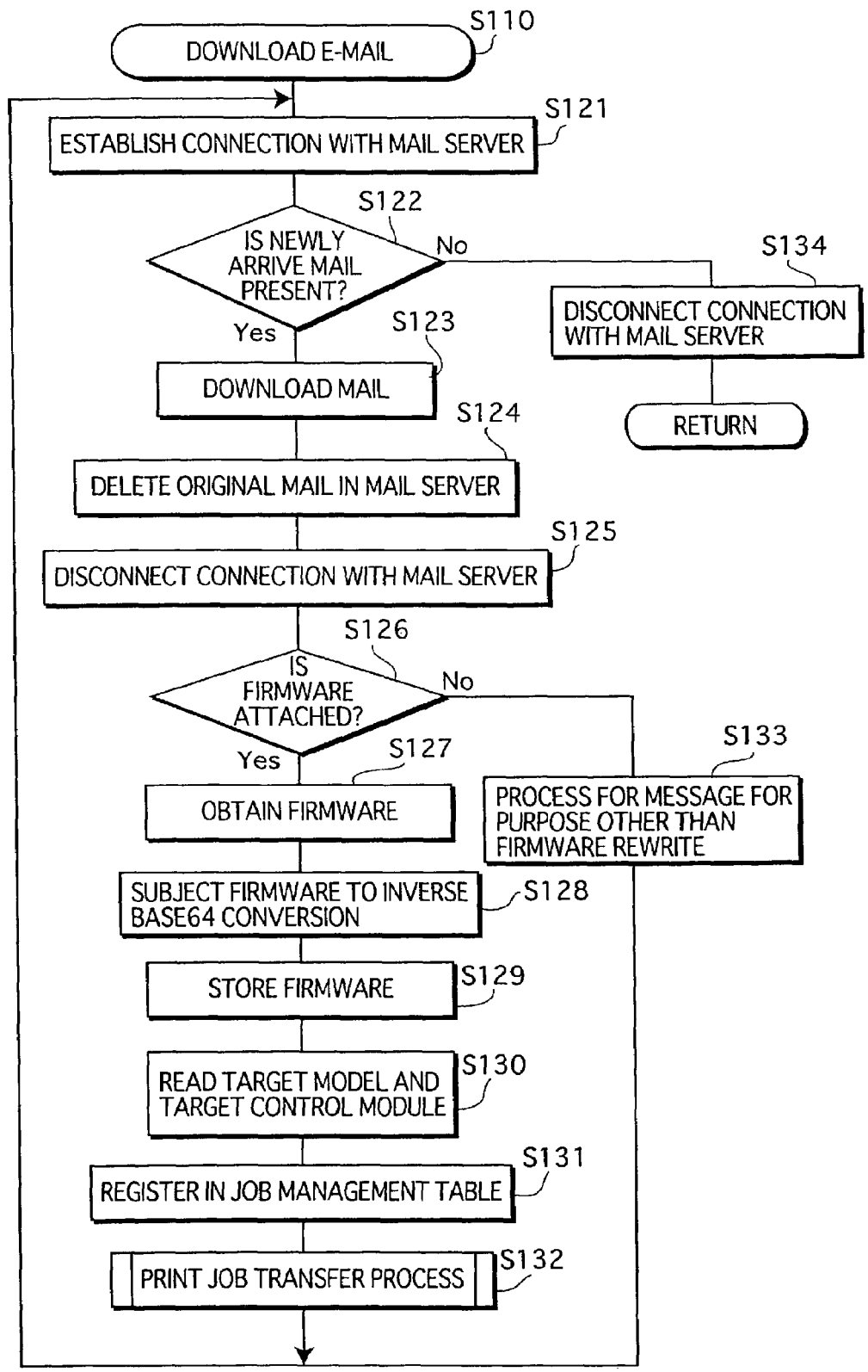
FIG. 13 is a flowchart showing contents of a subroutine of an e-mail download process.

FIG. 13 is a flowchart showing the contents of the subroutine of the e-mail download process.

As shown in the figure, the CPU 201 first establishes connection with the mail server 43 using TCP/IP (step S121). When judging that a newly arrived mail is present ("Yes" in step S122), the CPU 201 downloads the mail (step S123). POP3 (post office protocol) is used for this download process. It should be noted here that when a plurality of newly arrived mails are present, the CPU 201 downloads one of the mails.

The CPU 201 executes a process of deleting an original mail corresponding to the downloaded mail from the mail server 43 (step S124), and disconnects the connection with the mail server 43 (step S125).

Following this, the CPU 201 judges whether new firmware for a rewrite purpose is attached to the downloaded mail or not (step S126). This judgment is performed by judging whether a header of the mail includes the field "Content-Description" or not and whether the field "Content-Description" contains "Firmware" or not.

When judging that the firmware is attached ("Yes" in step S126), the CPU 201 obtains a character string that is composed of US-ASCII code into which firmware has been converted using the base 64 format (step S127). The CPU 201 then subjects the obtained character string to the inverse-base 64 conversion, to obtain binary data (step S128), and stores the binary data into the disk unit 205 (step S129).

Following this, the CPU 201 reads a rewrite target model name and a control module number from a value of the field "Subject" in the header of the message (step S130), and registers the contents into the job management table 211 (step S131). To be more specific, as shown in FIG. 12, a firmware rewrite job is written into the "job type" field, a value indicating the rewrite target model name and the module number into the "additional information" field, a storage address of firmware in the disk unit 205 into the "memory address" field, and an IP address of a transmission source written in the field "From" into the "client" field.

Referring back to FIG. 13, the CPU 201 assumes that a firmware rewrite job is scheduled as it obtains firmware by the processing from steps S126 to S129. To transfer a print job that is in an execution queue to another image processing apparatus, therefore, the CPU 201 executes the print job transfer process in step S132.

Figure 14:
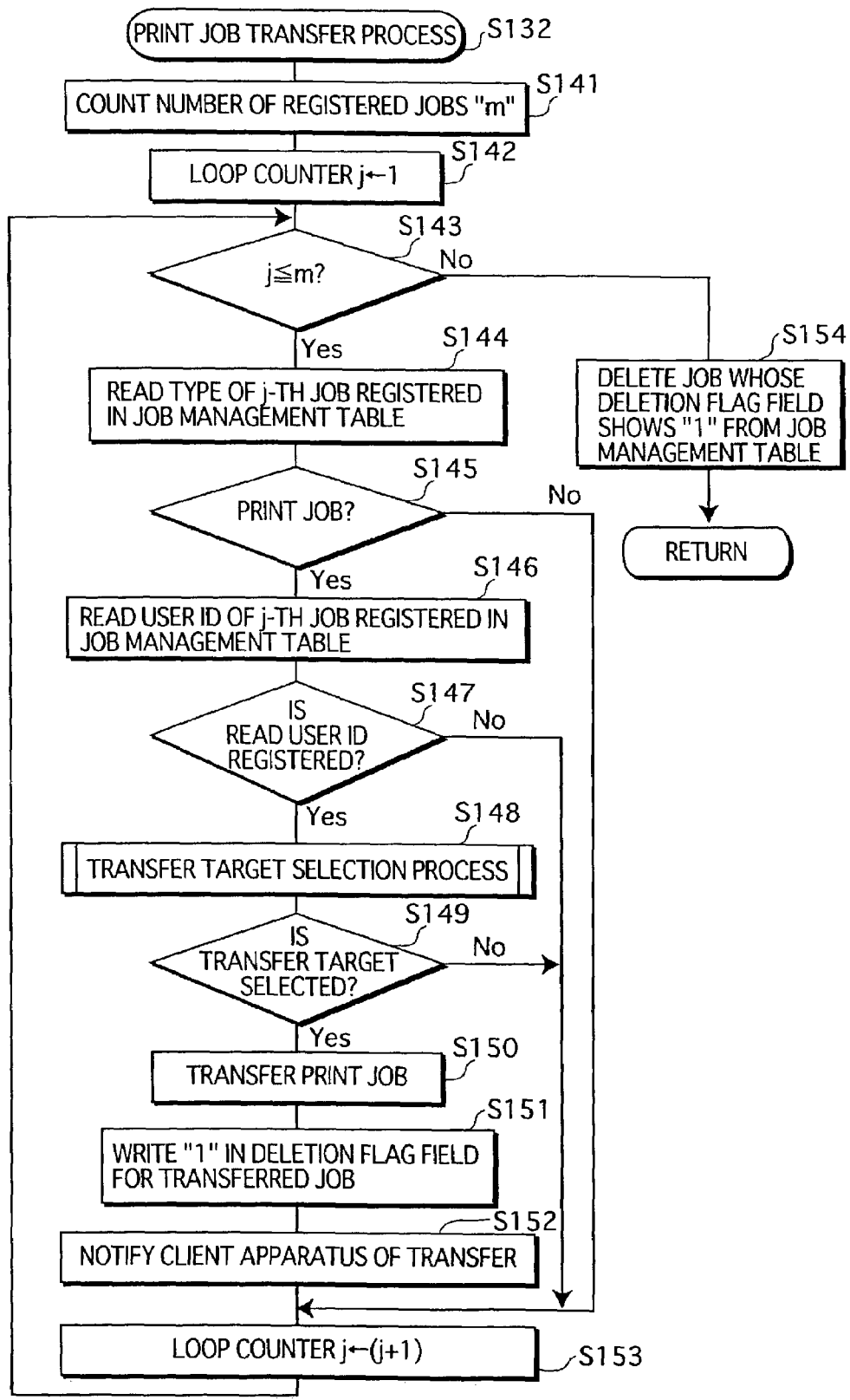
FIG. 14 is a flowchart showing contents of a subroutine of a print job transfer process.

FIG. 14 is a flowchart showing the contents of the subroutine of the print job transfer process.

As shown in the figure, the CPU 201 first counts the number of jobs "m" registered in the job management table 211 (step S141), and sets "1" at a loop counter "j" (step S142).

In step S143, the CPU 201 compares a value of "j" and a value of "m". Here, a value of "j" is assumed to be "1". Therefore, the CPU 201 judges that a condition "j≦m" is met ("Yes" in step S143), and reads a job type registered with the job number "j", i.e., with the job number "1" here, in the "job type" field of the job management table 211 (step S144). When the read job type is a print job ("Yes" in step S145), the CPU 201 reads a user ID of a client apparatus that has issued the print job from the "additional information" field (step S146), and judges whether the read user ID has been registered in the above-described permitted ID table (step S147) or not. When judging that the user ID has been registered ("Yes" in step S147), the CPU 201 executes a transfer target selection process of selecting a transfer target to which the print job is to be transferred (step S148).

Figure 15:
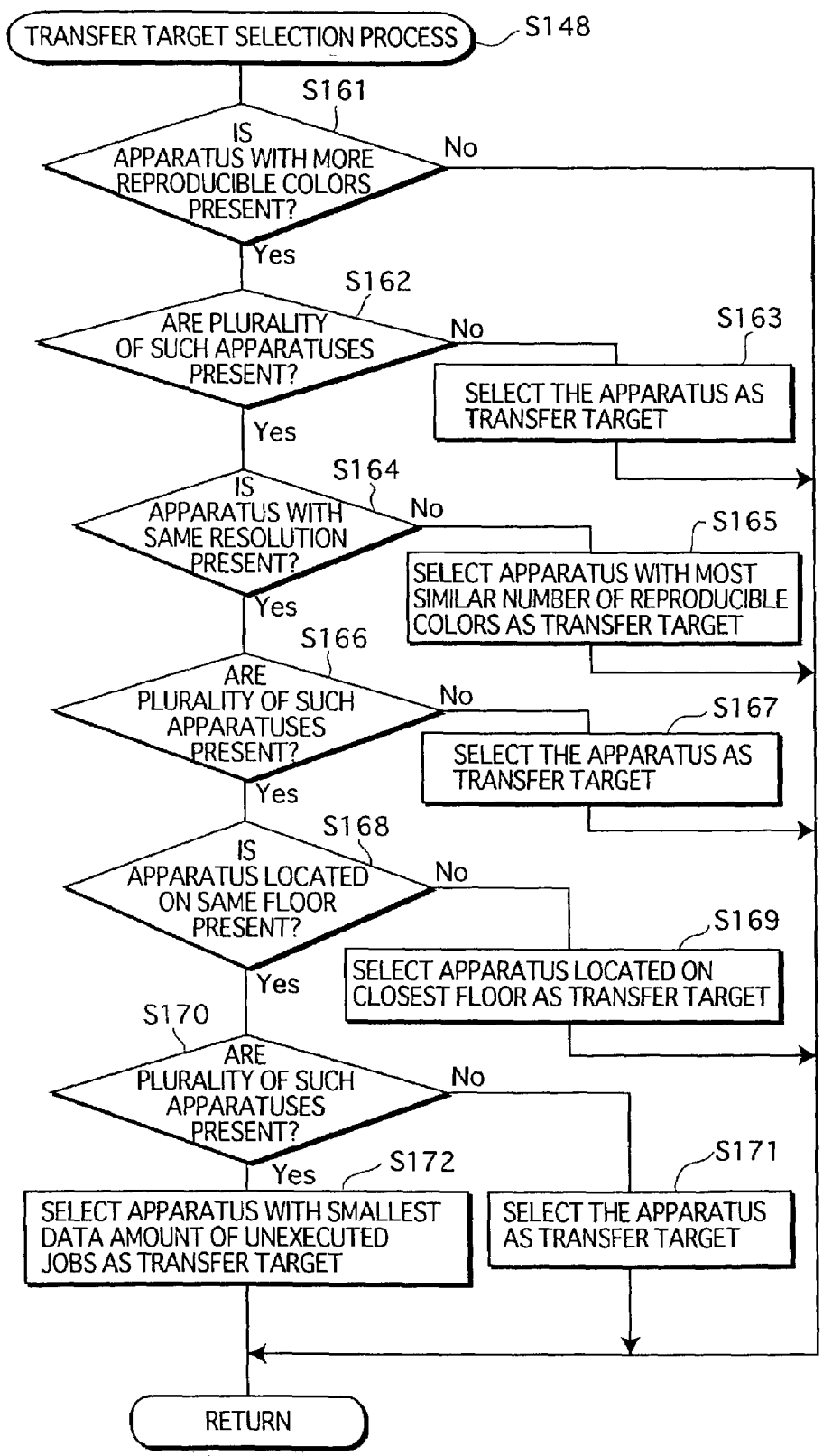
FIG. 15 is a flowchart showing contents of a subroutine of a transfer target selection process.

FIG. 15 is a flowchart showing the contents of the subroutine of the transfer target selection process. As shown in the figure, the CPU 201 judges whether an image processing apparatus whose number of reproducible colors (print colors) is equal to or greater than the number of reproducible colors of its own apparatus is connected to the LAN 51 or not (step S161). This judgment is performed based on the above-described image processing apparatus's attribute information obtained from each of the other image processing apparatuses 2, . . . . For example, information relating to reproducible colors indicates "two colors" when an image processing apparatus is only capable of monochrome printing, and "256 colors" when an image apparatus is capable of color printing. Such information can be exchanged among the image processing apparatuses. The CPU 201 compares the number of reproducible colors of the other image processing apparatuses with that of its own apparatus, to find an image processing apparatus with the number of reproducible colors being equal to or greater than its own apparatus.

When finding only one such apparatus with the number of reproducible colors being equal to or greater than its own apparatus ("Yes" in step S161 and "No" in step S162), the CPU 201 selects the apparatus as a transfer target to which the print job is to be transferred (step S163), and returns the processing to the subroutine of the print job transfer process. On the other hand, when finding a plurality of such apparatus with the number of reproducible colors being equal to or greater than its own apparatus ("Yes" in step S162), the CPU 201 advances the processing to step S164.

In step S164, the CPU 201 judges whether an image processing apparatus whose resolution is the same as resolution of its own apparatus is connected to the LAN 51 or not. Here, resolution is expressed by dpi (dot per inch). This judgment is performed based on information showing "resolution" obtained from each of the other image processing apparatuses.

When finding no other image processing apparatus with the same resolution with its own apparatus ("No" in step S164), the CPU 201 selects an image processing apparatus with the number of reproducible colors most similar to that of its own apparatus as a transfer target (step S165), and returns the processing to the subroutine of the print job transfer process.

On the other hand, when finding only one image processing apparatus with the same resolution as its own apparatus ("Yes" in step S164 and "No" in step S166), the CPU 201 selects the image processing apparatus as a transfer target (step S167), and returns the processing to the subroutine of the print job transfer process. It should be noted here that when the image processing apparatuses 1, 2, . . . , each have the same function, judgment results in steps S161, S162, S164, and S166 all show "Yes".

On the other hand, when finding a plurality of image processing apparatuses with the same resolution as its own apparatus ("Yes" in step S166), the CPU 201 judges whether any of the plurality of image processing apparatuses is located on the same floor as its own apparatus (step S168). This judgment is performed based on information showing an "installation location" obtained from each of the image processing apparatuses, i.e., information showing a floor on which each apparatus is located.

When judging that no image processing apparatus is located on the same floor as its own apparatus ("No" in step S168), the CPU 201 selects an image processing apparatus that is located on a floor closest to the floor on which its own apparatus is located, as a transfer target (step S169), and returns the processing to the subroutine of the print job transfer process.

On the other hand, when finding only one image processing apparatus located on the same floor as its own apparatus ("Yes" in step S168 and "No" in step S170), the CPU 201 selects the image processing apparatus as a transfer target (step S171), and returns the processing to the subroutine of the print job transfer process.

On the other hand, when finding a plurality of image processing apparatuses located on the same floor as its own apparatus ("Yes" in step S170), the CPU 201 selects an image processing apparatus with the smallest data amount of unexecuted jobs, out of the plurality of image processing apparatuses found to be on the same floor as its own apparatus, as a transfer target (step S172), and returns the processing to the subroutine of the print job transfer process. Here, as an unexecuted job data amount, information showing a total data amount of all jobs including print jobs that are in an execution queue is obtained from each of the image processing apparatuses. The image processing apparatus with the smallest unexecuted job data amount is selected here as a transfer target.

On the other hand, when finding no image processing apparatus with the number of reproducible colors being equal or greater than that of its own apparatus in step S161 ("No" in step S161), the CPU 201 returns the processing to the subroutine of the print job transfer process without selecting a transfer target.

Referring back to FIG. 14, in step S149, the CPU 201 judges whether a transfer target has been selected in the transfer target selection process or not. Here, such a case where a transfer target has not been selected occurs only when a judgment result in step S161 shows "No".

When judging that a transfer target has been selected ("Yes" in step S149), the CPU 201 reads the print job from the disk unit 205, and transfers the print job to the image processing apparatus selected as a transfer target, via the LAN 51 (step S150). As a protocol used for transferring the print job via the LAN 51, for example, a general protocol such as FTP (file transfer protocol) may be used, or a unique protocol based on TCP/IP may be used. The transferred print job is executed by the image processing apparatus that is the transfer target.

In step S151, the CPU 201 writes a value "1" into the "deletion flag" field corresponding to the transferred print job, i.e., the print job registered with the job number "1" here, in the job management table 211. Then, the CPU 201 reads an IP address of the client apparatus that has requested the print job from the "client" field in the job management table 211, transmits a message indicating which image processing apparatus the print job has been transferred (step S152), and returns the processing to step S153. The client apparatus that has received the message displays the message on the display. By looking at the display, the user of the client apparatus can know which image processing apparatus the print job he or she has requested has been transferred.

On the other hand, in step S149, when judging that a transfer target has not been selected, the CPU 201 advances the processing to step S153 without executing the print job transfer process.

Also, in step S147, when judging that the user ID has not been registered, the CPU 201 advances the processing to step S153 without executing the print job transfer process. This results in prohibition of the transfer process.

Also, in step S145, when judging that the job with the job number "1" is not a print job, i.e., that the job with the job number "1" is a firmware rewrite job, a copy job, or the like, the CPU 201 advances the processing to step S153.

In step S153, the CPU 201 increments the present value of the loop counter, i.e., "j=1" here, by one, and then returns the processing to step S143.

In step S143, the CPU 201 judges whether a condition "2≦m" is met. When the condition "2≦m" is met, the CPU 201 executes processing from steps S144 to S153 for a job registered at the second record in the job management table 211. The CPU 201 repeats the processing from steps S144 to S153 and executes the transfer process of unexecuted jobs one after another until a condition "j≦m" is no longer met in step S143. When judging that the condition "j≦m" is no longer met in step S143, the CPU 201 returns the processing to step S154. The CPU 201 deletes a print job whose "deletion flag" field in the job management table 211 shows "1" from the job management table 211, and then returns the processing to the subroutine of the e-mail download process. This results in print all jobs in an execution queue requested by a client apparatus whose user ID has been registered being transferred to other image processing apparatuses. The other jobs remain in the job management table 211, and are executed one after another in the order of reception.

Referring back to FIG. 13, when the print job transfer process in step S132 is completed, the CPU 201 returns the processing to step S121. On the other hand, when judging that firmware is not attached to any of downloaded mails, the CPU 201 executes a process to be executed when receiving a message for a purpose other than a firmware rewrite purpose, and returns the processing to step S121.

Then, in steps S121 and S122, the CPU 201 executes a check process of checking whether newly arrived mails are present or not, and repeats the processing from step S121 to S133 until no newly arrived mail is present. When judging that no newly arrived mail is present ("No" in step S122), the CPU 201 disconnects the connection with the mail server 43 (step S134), and returns the processing to the main routine.

Figure 16:
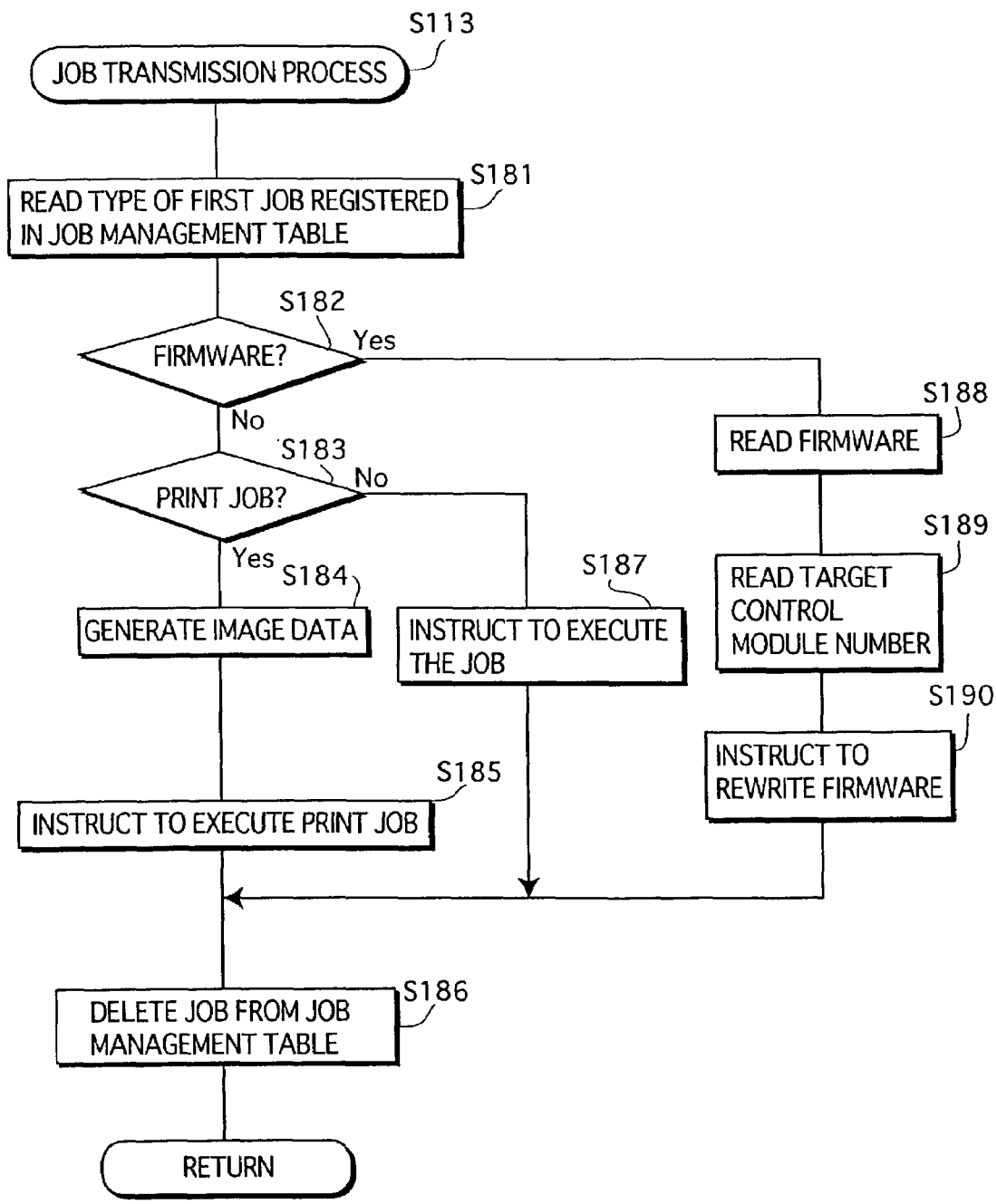
FIG. 16 is a flowchart showing contents of a subroutine of a job transmission process.

FIG. 16 is a flowchart showing contents of a subroutine of the job transmission process.

As shown in the figure, the CPU 201 reads a type of a job registered at the first record (with the job number "1") in the job management table 211 (step S181).

When judging that the read job type is not a firmware rewrite job but is a print job ("No" in step S182 and "Yes" in step S183), the CPU 201 refers to the "memory address" field in the job management table 211. The CPU 201 then reads print data for the print job from the disk unit 205, makes the image extension unit 208 extend the print data to generate image data (step S184), and instructs the image forming apparatus 11 to execute the print job (step S185). To be more specific, the CPU 201 reads information showing the number of copies to be printed, a paper size, and the like included in job control information and page control information written in the "additional information" field, transmits the generated image data together with the read information to the image forming apparatus 11, and makes the image forming apparatus 11 execute the print job.

On the other hand, when judging that the job type read in step S181 is not a firmware rewrite job nor a print job, i.e., that the read job type is a copy job or an image information transmission job ("No" in step S182 and "No" in step S183), the CPU 201 instructs the image forming apparatus to execute the job (step S187), and advances the processing to step S186.

When judging that the read job type is a firmware rewrite job ("Yes" in step S182), the CPU 201 refers to the "memory address" field in the job management table 211. The CPU 201 then reads firmware for the firmware rewrite job from the disk unit 205 (step S188), reads a control module number of a rewrite target, from the "additional information" field (step S189), and instructs to execute the firmware rewrite job (step S190). To be more specific, the CPU 201 transmits information showing the read firmware for a rewrite purpose and the read module number of the rewrite target to the image forming apparatus 11 via the serial I/F 206, and makes the image forming apparatus 11 execute the firmware rewrite job.

In step S186, the CPU 201 deletes the job whose execution has already been instructed, from the job management table 211, and returns the processing to the main routine.

1-7. Operation Contents of the Image Forming Apparatus 11

Figure 17:
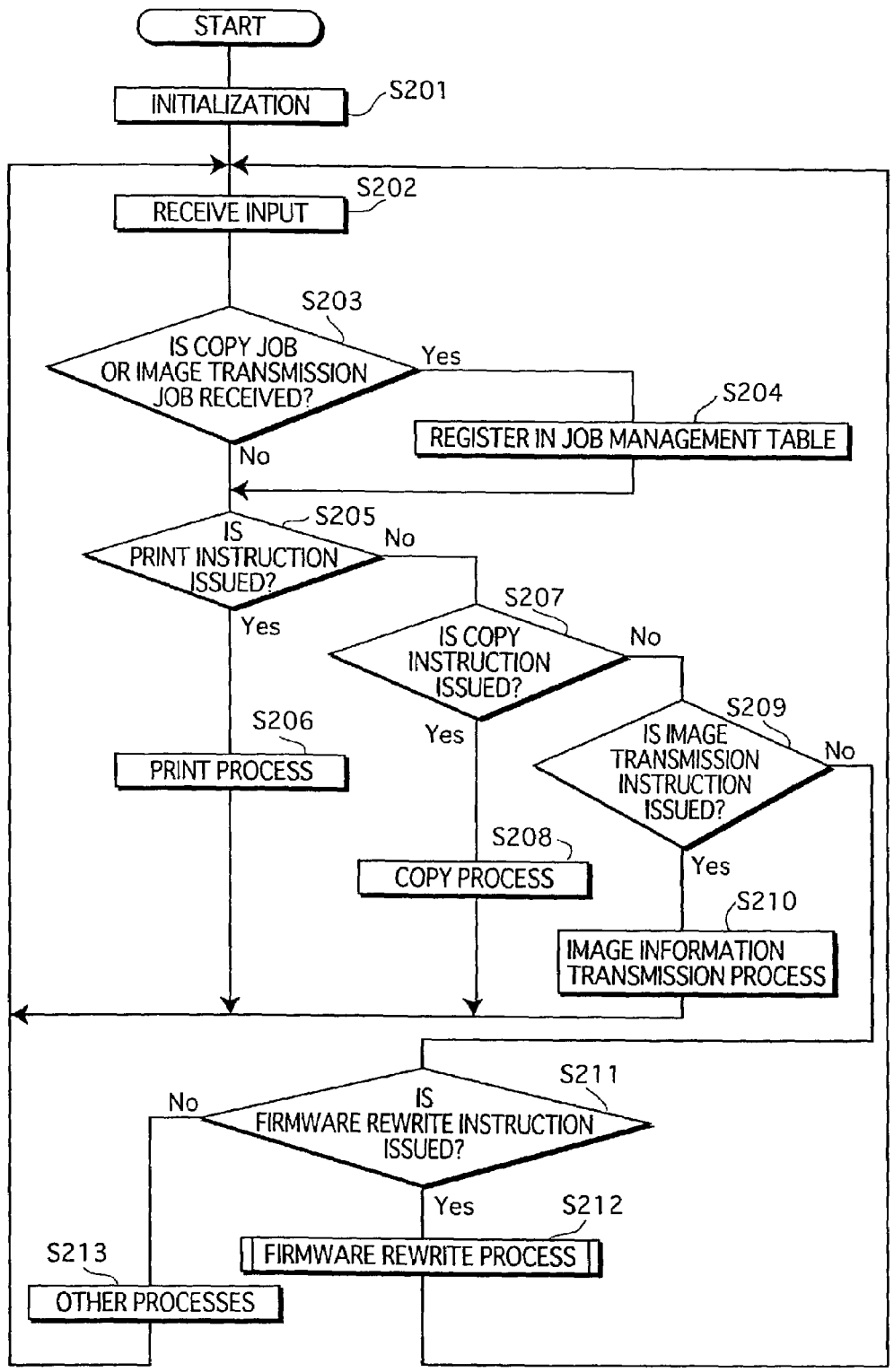
FIG. 17 is a flowchart showing contents of a process executed by a CPU or the like of an image forming apparatus.

FIG. 17 is a flowchart showing operation contents of the CPU 111 and the like of the image forming apparatus 11.

As shown in the figure, when power is turned on, the CPU 111 first executes an initialization process including an initialization of the S-RAM 113 within its own control module 110 and other internal memories, and an initialization of parameters and the like, and instructs the CPUs 121 to 141 of the control modules 120 to 140 to execute the same initialization process (step S201).

Following this, the CPU 111 receives an input of various signals and the like (step S202). Here, the various signals and the like include control data from the control modules 110 to 140, input signals resulting from key operations and the like of the control panel 119, signals and the like showing execution instructions of a print job and a firmware rewrite job from the printer controller 12.

At the time of receiving the input, when the CPU 111 judges that execution of a copy job or an image information transmission job is instructed by a key operation of the control panel 119 ("Yes" in step S203), the CPU 111 transmits a signal indicating that the job has been received, to the printer controller 12, makes the contents of the job registered in the job management table 211 (step S204), and advances the processing to step S205.

In step S205, the CPU 111 judges whether an execution instruction of a print job has been issued from the printer controller 12 or not.

When judging that the execution instruction of the print job has been issued ("Yes" in step S205), the CPU 111 and the like execute a print process based on image data transmitted from the printer controller 12 (step S206), and returns the processing to step S202.

On the other hand, when judging that an execution instruction of a copy job has been issued from the printer controller 12 ("No" in step S205 and "Yes" in step S208), the CPU 111 executes a copy process, i.e., a print process based on image data of a document read (step S208), and returns the processing to step S202. Also, when judging that an execution instruction of an image information transmission job has been issued ("No" in step S207 and "Yes" in step S209), the CPU 111 generates a mail to which image information of a document read is attached, executes a process of transmitting the generated mail to the printer controller 12 (step S210), and returns the processing to step S202.

When judging that an execution instruction of a firmware rewrite job has been issued from the printer controller 12 ("No" in step S209 and "Yes" in step S211), the CPU 111 executes a firmware rewrite process (step S212), and returns the processing to step S202.

Figure 18:
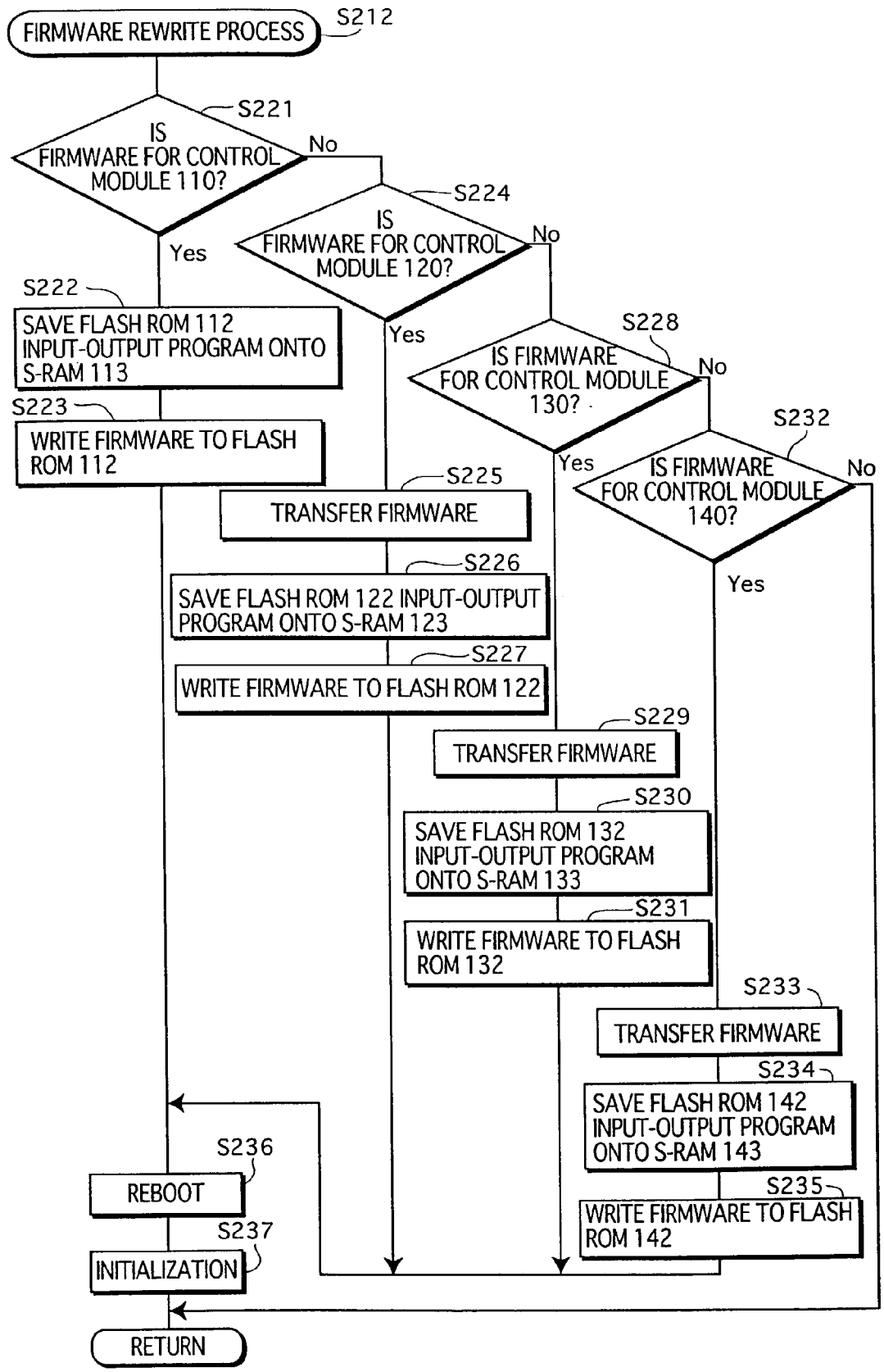
FIG. 18 is a flowchart showing contents of a subroutine of a firmware rewrite process.

FIG. 18 is a flowchart showing contents of a subroutine of the firmware rewrite process.

As shown in the figure, the CPU 111 and the like judge which control module the firmware received for a rewrite purpose corresponds to, based on the received information indicating the module number, and writes the firmware to a flash ROM in the control module judged to corresponds to the received firmware. To be more specific, when judging that the firmware for a rewrite purpose corresponds to the control module 110 ("Yes" in step S221), the CPU 111 saves an input-output program including a firmware rewrite program (hereafter simply referred to as an "input-output program") presently stored in the flash ROM 112 onto the S-RAM 113 (step S222), and writes the firmware over the flash ROM 112 using the input-output program (step S223). Then, the CPU 111 executes a rebooting process of once turning off the power of the apparatus and then turning on the power again (step S236), executes an initialization process (the same process as in step S201) (step S237), and returns the processing to the main routine.

On the other hand, when judging that the firmware for a rewrite purpose corresponds to the control module 120 ("No" in step S221 and "Yes" in step S224), the CPU 111 transfers the firmware to the control module 120 (step S225). The CPU 121 saves an input-output program presently stored in the flash ROM 122 onto the S-RAM 123 (step S226), and writes the firmware over the flash ROM 122 using the input-output program (step S227). Then, the CPU 121 advances the processing to step S236.

When judging that the firmware for a rewrite purpose corresponds to the control module 130 ("No" in step S224 and "Yes" in step S228), the CPU 111 transfers the firmware to the control module 130 (step S229). The CPU 131 saves an input-output program presently stored in the flash ROM 132 onto the S-RAM 133 (step S230), writes the firmware over the flash ROM 132 using the input-output program (step S231), and advances the processing to step S236.

When judging that the firmware for a rewrite purpose corresponds to the control module 140 ("No" in step S228 and "Yes" in step S232), the CPU 111 transfers the firmware to the control module 140 via the control module 130 (step S233). The CPU 141 saves an input-output program presently stored in the flash ROM 142 onto the S-RAM 143 (step S234), and writes the firmware over the flash ROM 142 using the input-output program (step S235), and advances the processing to step S236. It should be noted here that if the CPU 111 judges that the firmware for a rewrite purpose does not correspond to any of the control modules 110 to 140 ("No" in step S232), the CPU 111 returns the processing to the main routine without executing a rebooting process.

Referring back to FIG. 17, when judging that an execution instruction of a firmware rewrite job has not been issued in step S211, the CPU 111 executes another process, for example a communication process of various instructions and the like among control modules in step S213, and returns the processing to step S202.

As described above, the image processing apparatus in the present embodiment executes a rewrite process of firmware upon receipt of the firmware. At the time when the image processing apparatus receives the firmware, however, if a print job that has been requested from a client apparatus whose user ID is registered in advance is in an execution queue, the image processing apparatus transfers, via the LAN 51, the print job to another image processing apparatus that has the same resolution or the like, and notifies the client apparatus of which apparatus the print job has been transferred.

Accordingly, even with the construction realized at a reduced cost in which firmware is transmitted using a low-speed serial interface, a firmware rewrite job can be executed earlier than in conventional cases, and also, during the rewrite of the firmware, a print job can be transferred to another image processing apparatus selected as a transfer target and can be executed by the other image processing apparatus. As a result, occurrence of such a case where execution of either a firmware rewrite job or a print job is delayed for a long time can be reduced. Due to this, the user can use an image processing apparatus in which rewrite of firmware has been executed, i.e., an image processing apparatus with improved performances earlier. Also, this eliminates such a problem as that a print job that is in an execution queue is executed with rewrite of firmware not being executed, which may result in producing poor printing quality and requiring to execute the printing process again in the worst case. Therefore, the user can obtain a printed matter with a high quality output from an image processing apparatus that is known to the user as a transfer target of the print job.

Also, the image processing apparatus 1 transfers only a print job requested by a client apparatus with a user ID registered in the internally-stored permitted ID table. This means that the image processing apparatus 1 does not transfer a print job requested by a client apparatus whose user ID has not been registered therein. Accordingly, for example, if the user desires to have printing output only from his or her designated image processing apparatus, he or she may only register a user ID of the desired image processing apparatus, and may not register user IDs of other apparatuses.

Also, when a print job is transferred, an image processing apparatus with the number of reproducible colors being equal to or greater than an apparatus for which the print job is originally intended (hereafter referred to as the "present apparatus") and with the resolution being the same as the present apparatus is selected as a transfer target. This can eliminate such a case where a printing image different from an image intended by the user is output from a transfer target apparatus at the time of transmission of a print job before rewrite of firmware. Accordingly, the user can obtain a printed matter as desired. Further, when a plurality of image processing apparatuses with the same resolution as the present apparatus are present, an apparatus located on a floor closer to the present apparatus is selected as a transfer target. This can produce the effect of saving the user the trouble of fetching a printed matter output from a distant apparatus. Also, when a plurality of image processing apparatuses are located on the same floor as the present apparatus, an apparatus with the smallest data amount of unexecuted jobs is selected, and so the print job can be executed more promptly. Also, the effect of further reducing a wait time for the user can be produced.

Second Embodiment

Figure 19:
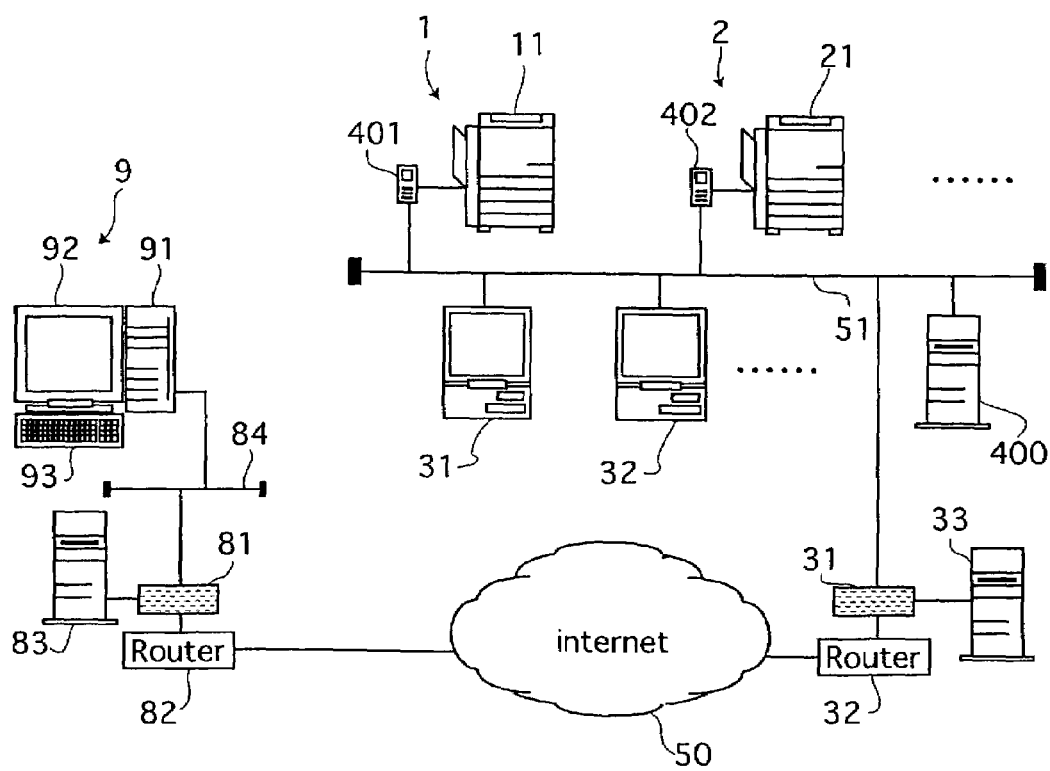
FIG. 19 is a diagram showing an overall construction of a system in a second embodiment of the present invention.

In the first embodiment, the printer controllers 12, 22, . . . , perform an overall control of print jobs such as a control over an execution order of the print jobs. In the present embodiment, however, a server 400 is connected to a LAN 51 as shown in FIG. 19, and the server 400 performs execution controls of print jobs. This is a major difference between the first embodiment and the present embodiment. Therefore, the present embodiment is described focusing only on the difference from the first embodiment. Components in the present embodiment that are the same as the components in the first embodiment are given the same reference numerals and are not described here.

2-1. Overall Construction

FIG. 19 is a diagram showing an overall construction of a system in the present embodiment. As shown in the figure, an image processing apparatus 1 in the present embodiment is constructed by connecting a printer controller 401 to an image forming apparatus 11. The printer controller 401 has basically the same construction as the above printer controller 12, except the following points. The printer controller 401 does not register a user ID of a client apparatus that has requested a print job in the "additional information" field in the job management table 211 (FIG. 12). This is because the server 400 selects a transfer target of a job using a user ID and so the printer controller 401 does not need to register the user ID as described later.

Also, instead of the print job transfer process in step S132 shown in FIG. 13, a transmission process of transmitting a firmware reception signal indicating that firmware has been received, to the server 400 via the LAN 51 is executed. To be more specific, instead of the print job transfer process (step S132) in the e-mail download process in step S110, out of processes of the main routine shown in FIG. 11, the printer controller 401 executes the transmission process of transmitting the firmware reception signal. It should be noted here that the construction of the printer controller 401 is the same as the constructions of the printer controllers 402, . . . , of the other image processing apparatuses 2, . . . .

Referring back to FIG. 19, the server 400 can function as a so-called printer server, i.e., the server 400 has the function of providing such a service that enables each of the client apparatuses 31, 32, . . . , connected to the LAN 51 to share each of the image processing apparatuses 1, 2, . . . , as a printer. Also, the server 400 can store user IDs of the client apparatuses 31, 32, . . . .

2-2. Process Executed by the Server 400

Figure 20:
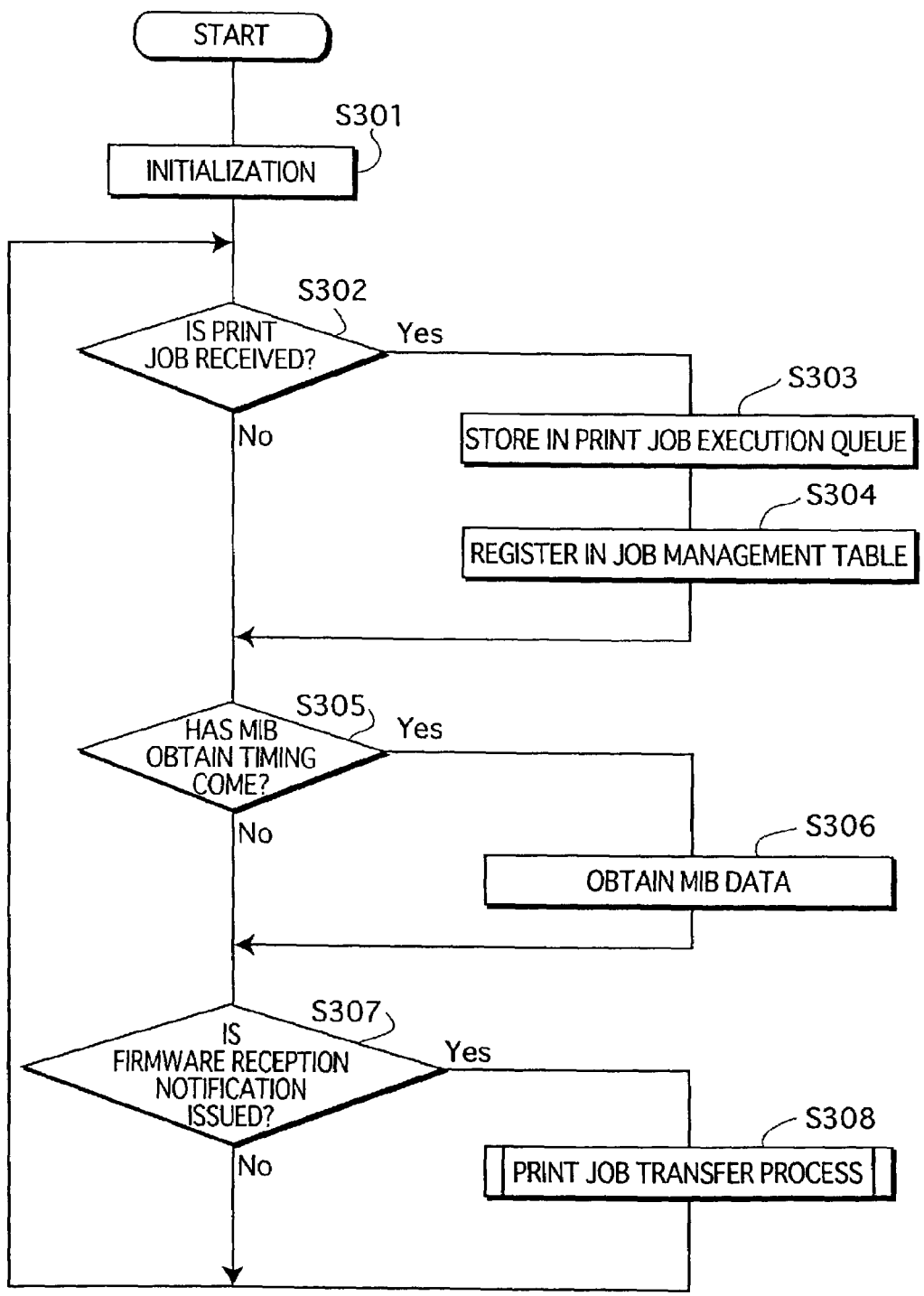
FIG. 20 is a flowchart showing contents of a process executed by a server.

FIG. 20 is a flowchart showing contents of a process executed by a control unit (not shown) of the server 400.

As shown in the figure, when power is turned on, the server 400 first executes an initialization process including an initialization of its internal memories, and an initialization of parameters, and the like (step S301).

In step S302, the server 400 judges whether a print job has been received from the client apparatuses 31, 32, . . . . When judging that no print job has been received ("No" in step S302), the server 400 advances the processing to step S305. On the other hand, when judging that a print job has been received ("Yes" in step S302), the server 400 places the print job in a print job execution queue, and registers the contents of the print job into the job management table (steps S303 and S304). Here, the job management table has the same construction as the job management table in the first embodiment, except that a "recipient" field showing a recipient of the print job designated by a client apparatus is newly provided. In the "recipient" field, an IP address of an image processing apparatus that is the recipient of the print job is written. Also, in the "additional information" field, information including a user ID etc., of a client apparatus included in job control information and page control information is written. Print jobs placed in the print job execution queue are read by the FIFO (first-in, first-out) method, and are transmitted one after another to an image processing apparatus that is designated as a recipient of the corresponding print job.

In step S305, the server 400 judges whether a timing for obtaining MIB has come or not. When judging that the timing has come ("Yes" in step S305), the server 400 obtains the above "image processing apparatus's attribute information" from each of the image processing apparatus 1, 2, . . . (step S306). When judging that the timing has not come ("No" in step S305), the server 400 advances the processing to step S307.

In step S307, the server 400 judges whether a firmware reception notification has been received or not. This judgment is performed by judging whether a firmware reception signal has been received from the printer controllers 401, 402, . . . of the image processing apparatuses 1, 2, . . . . By doing so, the server 400 can know which image processing apparatus has received firmware and accordingly, whether rewrite to the firmware is about to be performed or not. When judging that the firmware reception signal has not been received ("No" in step S307), the server 400 returns the processing to step S302. When judging that the firmware reception signal has been received ("Yes" in step S307), the server 400 executes a print job transfer process (step S308), and returns the processing to step S302.

Figure 21:
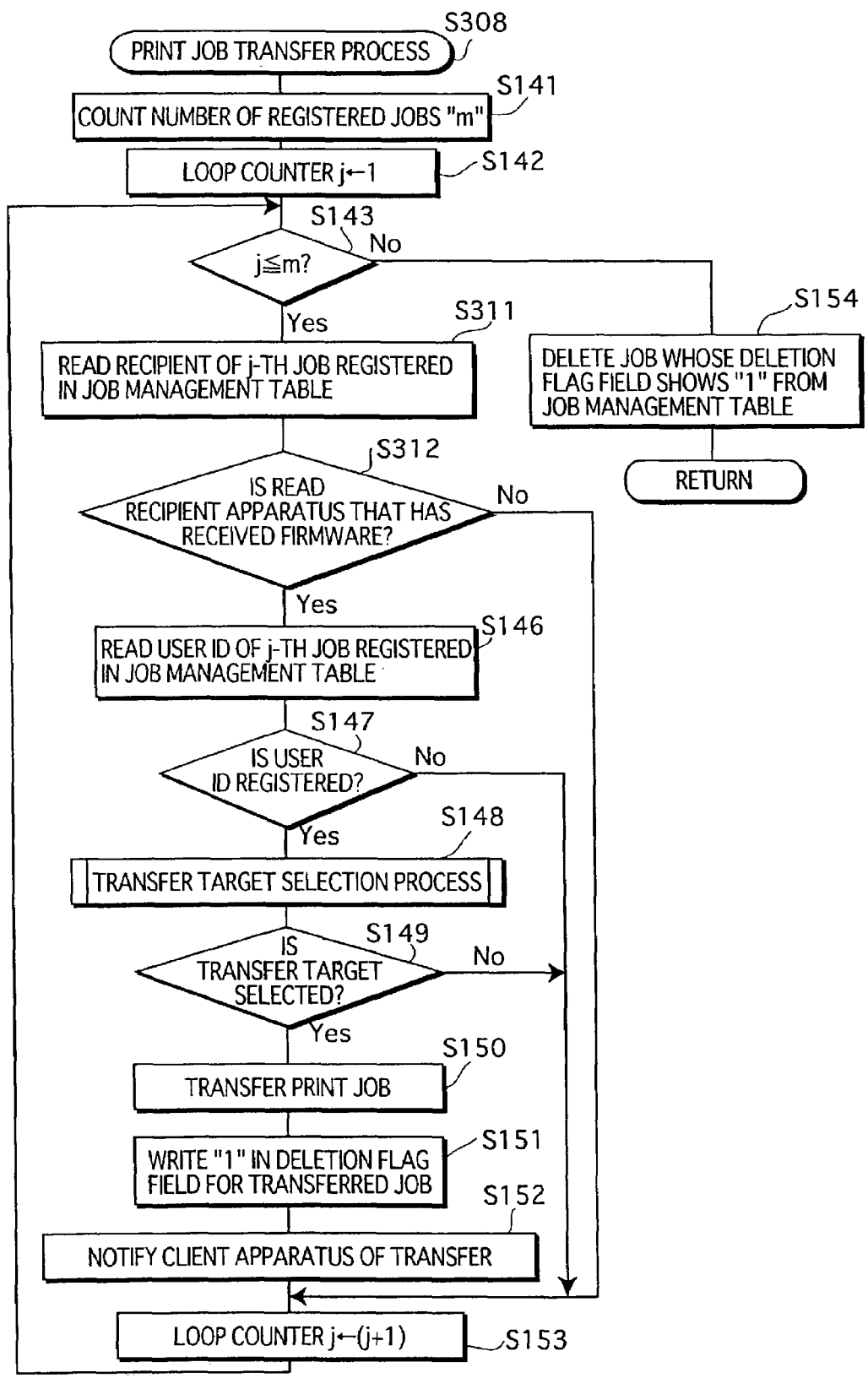
FIG. 21 is a flowchart showing contents of a subroutine of a print job transfer process in the second embodiment.

FIG. 21 is a flowchart showing contents of a subroutine of the print job transfer process in step S308.

As shown in the figure, the print job transfer process is substantially the same as the print job transfer process (FIG. 14) in the first embodiment, with the difference being in that the processing in steps S144 and S145 is replaced by the processing in steps S311 and S312. Here, the print job transfer process is described focusing on the processing in step S311 and S312, and the same steps as the steps of the print job transfer process in the first embodiment are given the same step numbers and are not described here.

In step S311, the server 400 reads, out of print jobs that are in an execution queue in the job management table, a recipient of a print job registered at the j-th record in the job management table. Then, in step S312, the server 400 judges whether the image processing apparatus that is the read recipient is the image processing apparatus that has transmitted the firmware reception signal, i.e., the image processing apparatus that has received the firmware. When judging that the read recipient is the image processing apparatus that has received the firmware ("Yes" in step S312), the server 400 executes the processing from step S146. To be more specific, when a user ID of a client apparatus that has requested the print job is a registered user ID ("Yes" in step S147), the server 400 selects an image processing apparatus to which the print job is to be transferred (step S148), and transfers the print job to the selected image processing apparatus. On the other hand, when judging that the read recipient is not the image processing apparatus that has received the firmware ("No" in step S312), the server 400 advances the processing to step S153 without executing the print job transfer process.

As described above, if receiving a firmware reception signal indicating reception of firmware from an image processing apparatus, the server 400 relating to the present embodiment executes a process of transferring a print job that is in an execution queue and whose recipient is to be the image processing apparatus that has transmitted the firmware reception signal, to another image processing apparatus. Accordingly, the construction enabling the server 400 to have the print job transfer function can produce the same effect as above of executing both a firmware rewrite job and a print job more promptly than in conventional cases.

3. Modification Examples

Although the present invention has been described based on the above embodiments, it should be clear that the present invention is not limited to the above embodiments. For example, the following modifications are possible.

3-1.

Although the above embodiments describe the case where the printer controller 12 judges whether a print job is to be transferred or not (a print job is prohibited or not) by judging whether a user ID of a client apparatus that has transmitted the print job has been registered as a user ID to which a job transfer is permitted or not, the present invention should not be limited to this method. For example, such a construction may be employed to perform this judgment based on a length of a processing time of the print job. This construction can be realized by replacing the print job transfer process shown in FIG. 14 by a print job transfer process shown in FIG. 22.

FIG. 22 is a flowchart showing contents of the print job transfer process relating to this modification example. As shown in the figure, the print job transfer process of the present modification example is substantially the same as the print job transfer process shown in FIG. 14, with the difference being in that the processing in steps S146 and S147 is replaced by the processing in steps S501 and S502. The print job transfer process of the present modification example is described focusing only on the processing in steps S501 and S502. Steps that are the same as the steps in the print job transfer process of the above embodiments are not described here.

In step S501, a predictive processing time of a print job registered at the j-th record in the job management table 211 is calculated. The predictive processing time of the print job is a time that is predicted to be required from the start to the end of execution of the print job. The predictive processing time can be calculated by multiplying a "print data size" by a "processing time per unit size". Here, the "print data size" is a capacity of the print data. The "processing time per unit size" can be calculated in the following way. The actual processing time to be taken for a print process is calculated by an experiment and the like, based on print data of a predetermined size. Then, the actual processing time is divided by the predetermined size, to obtain a value for the processing time per unit size. The processing time per unit size is stored in advance in the EP-ROM 202, and is read when the predictive processing time is calculated.

It should be noted here that a calculation method of the predictive processing time should not be limited to the above method. For example, another method may be used of calculating in advance a time taken for a printout of one paper sheet and multiplying the calculated time by the number of paper sheets to be printed out by the print job. Also, in the case where various image processing such as image rotation, enlargement and reduction, resolution change, is to be performed, a time taken for a printout of the same data size may vary depending on whether such image processing is performed or not. Therefore, to obtain a more precise predictive processing time, the predictive processing time may be calculated based on the contents of the image processing to be performed.

In step S502, a judgment is performed as to whether the calculated predictive processing time is equal to or greater than a predetermined time. Here, a value of the predetermined time may be determined so as to minimize a wait time for a print job and a firmware rewrite job, and the determined value is stored in advance in the EP-ROM 202. To be more specific, when the predictive processing time is equal to or greater than the predetermined time ("Yes" in step S502), the processing from step S148 is executed, and the print job is transferred. On the other hand, when the predictive processing time is shorter than the predetermined time ("No" in step S502), the transfer process is not executed, and the processing advances to step S152.

Accordingly, the above predetermined time should be set in such a manner that a job whose data size is large, e.g., a print job involving a large number of print copies, is transferred, and a job whose data size is small, e.g., a print job involving a few print copies, is not transferred. By doing so, if a print job with a large data size is in an execution queue when firmware is received, the print job is transferred to another image processing apparatus.

For example, when rewrite of firmware aims at eliminating problems such as a paper jam, it is better to transfer the print job to another image processing apparatus rather than to execute the print job involving a large number of print copies by an apparatus for which the print job is originally intended. This is because the apparatus for which the print job is originally intended may cause a paper jam or the like before the rewrite of the firmware is executed. By doing so, the effect of performing the print process earlier and executing the rewrite of the firmware more promptly can be produced. Also, if a print job with an extremely small data size is in an execution queue when firmware is received, rewrite of the firmware is executed after the print process for the print job is completed. However, because such a print job with an extremely small data size often involves a small number of copies to be printed, the rewrite of the firmware is not delayed so long. Also, this is convenient for a user who has requested the print job because the print copies are output from an apparatus he or she has designated.

Also, although the above embodiments describe the case where a judgment is performed as to whether transfer of a print job is possible or not, such a construction that transfers all print jobs may be employed. In this case, rewrite of firmware can be executed immediately as required. Further, because a judgment as to whether a print job can be transferred or not does not need to be provided, the print job transfer process can be simplified. Also, when a plurality of print jobs are in an execution queue, such a construction that sequentially allocates these print jobs one at a time to one apparatus may be employed.

3-2.

In the above print job transfer target selection process (step S148), a transfer target of a print job is selected based on each information item obtained as image processing apparatus's attribute information, namely, reproducible colors, resolution, an installment location, and a data amount of unexecuted jobs. However, for example, a transfer target may be selected based on one of the above information items or a combination of two or three of the above information items. Further, a transfer target may be selected based on other information relating to an image quality, e.g., information indicating whether an image processing apparatus has an equivalent font type or not, and information indicating whether an image processing apparatus can print out with an equivalent layout or not.

Also, in the above print job transfer target selection process, when an image processing apparatus with the number of reproducible colors being equal to or greater than the apparatus for which the print job is originally intended (here after referred to as the "present apparatus") is not present ("No" in step S161), a transfer target is not selected. However, when a plurality of image processing apparatuses with the number of reproducible colors being smaller than the present apparatus are present, one of such image processing apparatuses that has a similar number of reproducible colors as the present apparatus may be selected as a transfer target. Also, an image processing apparatus selected as a transfer target may not necessarily be an image processing apparatus that has the same resolution as the present apparatus. For example, an image processing apparatus with the most similar resolution as the present apparatus may be selected as a transfer target. By doing so, there may be a case where an image processing apparatus with the number of reproducible colors and resolution being degraded as compared with the present apparatus is selected as a transfer target and an image quality and the like are degraded to a certain degree. However, considering the above-described case where rewrite of firmware aims at eliminating problems such as a paper jam, for example, it may be still advantageous to execute a print process earlier by transferring the print job to another image processing apparatus than to make the present apparatus execute the print process.

Further, a certain image processing apparatus may be set in advance as a transfer target of a print job, and a print job in an execution queue may be always transferred to the image processing apparatus. In this case, the transfer target selection process (step S148) does not need to be executed, thereby simplifying the print job transfer process.

3-3.

Although the above embodiments describe the construction in which a print job is requested as an image processing job by a client apparatus, the construction may be such that a scan job is requested to an image processing apparatus as an image processing job. Upon receipt of the scan job request, the image processing apparatus reads an image of a document set thereon and transmitting the read image to an apparatus that has requested the scan job. With this construction, if a scan job is in an execution queue when firmware is received, the image processing apparatus 1 selects a transfer target of the scan job and transfers the scan job to the selected transfer target, when a user ID of a client apparatus that has transmitted the scan job has been registered in the permitted ID table. Accordingly, a user who has requested the scan job is required to set a document on the image processing apparatus that is selected as a transfer target, and make the document read by the apparatus.

3-4.

The above embodiments describe the case where, when firmware is received, a print job that is judged to be transfer-possible, out of print jobs in an execution queue, is transferred to an apparatus selected as a transfer target in the transfer target selection process. However, the following construction may also be employed. Suppose that a new job received during a time period from when the firmware is received to when rewrite to the firmware is started. In this case, the received new print job may be transferred for the reason that the rewrite of the firmware is scheduled.

This construction can produce the following effects. With the above construction described in the embodiments, an apparatus that transmits firmware and an apparatus that transmits a print job are different. In this case, a user who requests a print job cannot know whether an image processing apparatus has received firmware or not. There may be a case where the user requests a print job to the image processing apparatus without knowing that rewrite of firmware is scheduled, and he or she is kept waiting for a long time. To avoid such a case, for example, a method may be considered for the user checking a reception state of firmware on the control panel or the like of the image processing apparatus. In this case, when the user finds that the image processing apparatus has received the firmware, he or she may request the print job to another image processing apparatus. However, this method may place a heavy burden on the user. Therefore, the above-described construction in which a print job received between the reception of firmware to the start of rewrite to the firmware is transferred is advantageous. By employing this construction, for example, even if the user requests a print job without knowing that rewrite of firmware is scheduled to be started, the print job is automatically transferred to another image processing apparatus and executed by the other image processing apparatus. As a result, the effect can be produced of avoiding such a case where a firmware rewrite job as well as a print job are delayed long, and also of placing no such burden on the user.

3-5.

Further, such a construction may be employed as that when a print job, a scan job, or the like, is received while firmware is being rewritten, the received job or the like is transferred. Given that rewrite of firmware may require a processing time of several tens minutes, a received print job or the like being transferred can be executed earlier than being executed after completion of the rewrite of the firmware. Therefore, the effect can be produced of reducing a wait time of the print job or the like.

In this case, the printer controller 12 is required to judge whether rewrite of firmware is being executed in the image forming apparatus 11 or not. This judgment may be performed in the following way. For example, when the image forming apparatus 11 completes rewrite of firmware and is rebooted, it may transmit a signal (a rewrite completion signal) indicating the completion of the firmware rewrite, to the printer controller 12. The printer controller 12 judges that firmware is presently being rewritten, in a time period from when instructing the image forming apparatus 11 to rewrite the firmware (step S190) to when receiving the above rewrite completion signal.

To be more specific, the above-described effect can be produced by transferring during a time period from when new firmware is received to when rewrite to the new firmware is completed, an unexecuted image processing job that is at least one of (1) an image processing job in an execution queue when new firmware is received, and (2) an image processing job received during the above time period.

3-6.

Although the above embodiments describe the case where an image processing apparatus receives firmware as being attached to a mail, the method of obtaining firmware is not limited to such. For example, firmware may be obtained by making the printer controller 12 directly read firmware recorded on a CD-ROM or the like.

3-7.

Although the above embodiments describe firmware as boot programs or the like executed by each module in the image processing apparatus 1, firmware may be programs or data that cannot be dynamically corrected by a computer during computing, or programs or data that cannot be changed by the user. Firmware may be a generic name for boot programs and input-output programs, such as an OS, an interpreter, a compiler, and a BIOS (basic input-output system).

3-8.

Although the above embodiments describe the case where the image forming apparatus 11 and the printer controller 12 are separately provided, the printer controller may be incorporated into the image forming apparatus. Also, although the above embodiments take an image forming apparatus that functions as an MFP for example, the present invention should not be limited to such. For example, the present invention can be applied to a general image processing apparatus that has the function of execution an image processing job, such as a printer, a scanner, and a facsimile.

3-9.

Although the above embodiments describe the case where the present invention is applied to an image processing apparatus or a server, the present invention should not be limited to such. For example, the present invention may be applied to a method for transferring an image processing job such as a print job placed in an image processing apparatus or a server. Further, the present invention may be applied to a program realizing the method by a computer. Also, the present invention may be applied to a computer-readable recording medium on which the program is recorded. Examples of a computer-readable recording medium include a flexible disk, a hard disk, a CD-ROM, an MO, a DVD, a DVD-ROM, a DVD-RAM, and a semiconductor memory. Also, the program of the present invention may not necessarily include all modules for making a computer execute the above described processes. For example, general programs that can be installed separately, such as a communication program or a program included in an OS, may be used to make the computer execute each of the processes realizing the present invention. Further, the present invention may be a management apparatus (a printer controller) that manages an image forming apparatus.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing apparatus that is connected to a network and that executes an image processing job, comprising:
    a memory storing firmware;
    an image processing job reception unit for receiving an image processing job;
    a firmware obtaining unit for obtaining new firmware for a rewrite purpose;
    a firmware rewrite controller for rewriting the firmware stored in the memory to the obtained new firmware; and
    a job transfer controller for transferring an unexecuted image processing job to another image processing apparatus connected to the network, during a rewrite time period from when the new firmware is obtained to when rewriting of the obtained new firmware is completed, the unexecuted image processing job being at least one of (a) an image processing job that is in a wait state for execution when the new firmware is obtained, and (b) an image processing job that is received during the rewrite time period.

2. The image processing apparatus of claim 1, further comprising,
    a judgment unit for judging whether the unexecuted image processing job is to be transferred or not, by referring to job attribute information that indicates an attribute of the unexecuted image processing job,
    wherein the job transfer controller transfers the unexecuted image processing job when the judgment unit judges that the unexecuted image processing job is to be transferred.

3. The image processing apparatus of claim 2,
    wherein the job attribute information is an identification number of a client apparatus that has transmitted the unexecuted image processing job, and
    the judgment unit judges that the unexecuted image processing job is not to be transferred, when the identification number does not match an identification number that is registered in advance as a number for which such a job transfer is permitted.

4. The image processing apparatus of claim 2,
    wherein the job attribute information is a processing time period that is predicted to be required for executing the unexecuted image processing job, and the judgment unit judges that the unexecuted image processing job is not to be transferred, when the processing time period is shorter than a predetermined time period.

5. The image processing apparatus of claim 4,
wherein the judgment unit includes
a calculation subunit for calculating the processing time period, based on a data amount of the unexecuted image processing job and an image processing speed of the apparatus.

6. The image processing apparatus of claim 1,
wherein the job transfer controller includes:
an obtaining subunit for obtaining apparatus attribute information for a plurality of other image processing apparatuses connected to the network, the apparatus attribute information indicating attributes of the plurality of other image processing apparatuses; and
a selection subunit for selecting a transfer target out of the plurality of other image processing apparatuses, based on the obtained apparatus attribute information.

7. The image processing apparatus of claim 6,
wherein the apparatus attribute information includes at least one of a number of colors, a resolution, an installation location, and an image processing job's wait status.

8. The image processing apparatus of claim 1, further comprising,
an output unit for outputting information indicating a transfer target to which the unexecuted image processing job is to be transferred.

9. The image processing apparatus of claim 1,
wherein the network includes the Internet, and
the firmware is distributed via the Internet as being attached to e-mail.

10. The image processing apparatus of claim 1,
wherein the image processing apparatus includes a printer, and
the image processing job includes a print job.

11. An image processing method for use in an image processing apparatus that is connected to a network, has a function of rewriting firmware incorporated therein, and executes a received image processing job based on new firmware to which the firmware has been rewritten, the image processing method comprising:
an obtaining step of obtaining new firmware for a rewrite purpose; and
a transfer step of transferring an unexecuted image processing job to another image processing apparatus connected to the network, during a rewrite time period from when the new firmware is obtained to when rewriting of the obtained new firmware is completed, the unexecuted image processing job being at least one of (a) an image processing job that is in a wait state for execution when the new firmware is obtained, and (b) an image processing job that is received during the rewrite time period.

12. The image processing method of claim 11, further comprising,
a judgment step of judging whether the unexecuted image processing job is to be transferred or not, by referring to job attribute information that indicates an attribute of the unexecuted image processing job,
wherein in the transfer step, the unexecuted image processing job is transferred when a judgment result in the judgment step shows that the unexecuted image processing job is to be transferred.

13. The image processing method of claim 12,
wherein the job attribute information is an identification number of a client apparatus that has transmitted the unexecuted image processing job, and
in the judgment step, a judgment result shows that the unexecuted image processing job is not to be transferred, when the identification number does not match an identification number that is registered in advance as a number for which such a job transfer is permitted.

14. The image processing method of claim 12,
wherein the job attribute information is a processing time period that is predicted to be required for executing the unexecuted image processing job, and
in the judgment step, a judgment result shows that the unexecuted image processing job is not to be transferred, when the processing time period is shorter than a predetermined time period.

15. The image processing method of claim 11,
wherein the job transfer step includes:
an obtaining substep of obtaining apparatus attribute information for a plurality of other image processing apparatuses connected to the network, the apparatus attribute information indicating attributes of the plurality of other image processing apparatuses; and
a selection substep of selecting a transfer target out of the plurality of other image processing apparatuses, based on the obtained apparatus attribute information.

16. The image processing method of claim 11, further comprising,
an output step of outputting information that indicates a transfer target to which the unexecuted image processing job is to be transferred.

17. A computer readable medium having a computer program thereon for effecting an image processing method for use in an image processing apparatus that is connected to a network, has a function of rewriting firmware incorporated therein, and executes a received image processing job based on new firmware to which the firmware has been rewritten, the image processing method comprising:
an obtaining step of obtaining new firmware for a rewrite purpose; and
a transfer step of transferring an unexecuted image processing job to another image processing apparatus connected to the network, during a rewrite time period from when the new firmware is obtained to when rewriting of the obtained new firmware is completed, the unexecuted image processing job being at least one of (a) an image processing job that is in a wait state for execution when the new firmware is obtained, and (b) an image processing job that is received during the rewrite time period.

* * * * *